(12) United States Patent
Liu

(10) Patent No.: US 10,873,434 B2
(45) Date of Patent: Dec. 22, 2020

(54) SIGNAL PROCESSING METHOD AND APPARATUS

(71) Applicant: Huawei Technologies Co., Ltd., Shenzhen (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 16/230,791

(22) Filed: Dec. 21, 2018

(65) Prior Publication Data

US 2019/0123874 A1    Apr. 25, 2019

Related U.S. Application Data

(63) Continuation of application No. PCT/CN2018/099625, filed on Aug. 9, 2018.

(30) Foreign Application Priority Data

Aug. 11, 2017 (CN) .......................... 2017 1 0687513

(51) Int. Cl.
*H04L 5/00* (2006.01)
*H04W 56/00* (2009.01)
(Continued)

(52) U.S. Cl.
CPC ........ *H04L 5/0048* (2013.01); *H04J 11/0069* (2013.01); *H04J 13/0029* (2013.01);
(Continued)

(58) Field of Classification Search
CPC ............... H04W 56/001; H04J 11/0069; H04J 13/0029; H04L 27/2627
See application file for complete search history.

(56) References Cited

U.S. PATENT DOCUMENTS

| 2011/0244850 A1 | 10/2011 | Lindoff et al. |
| 2014/0133607 A1 | 5/2014 | Pu et al. |
| 2018/0262308 A1* | 9/2018 | Si .......................... H04L 5/0048 |

FOREIGN PATENT DOCUMENTS

| CN | 101601194 A | 12/2009 |
| CN | 103813362 A | 5/2014 |

(Continued)

OTHER PUBLICATIONS

"3rd Generation Partnership Project; Technical Specification Group Radio Access Network; Study on New Radio Access Technology Physical Layer Aspects (Release 14)", 3GPP Standard;Technical Report; 3GPP TR 38.802, vol. RAN WG1,No. V14.1.0, Jun. 23, 2017 (Jun. 23, 2017), pp. 1-143, XP051299025.

(Continued)

*Primary Examiner* — Kevin C. Harper
*Assistant Examiner* — Derrick V Rose
(74) *Attorney, Agent, or Firm* — Slater Matsil, LLP

(57) ABSTRACT

A method includes: generating a reference signal sequence based on a first m-sequence and a second m-sequence, where the reference signal sequence is a gold sequence, a cyclic shift value of the first m-sequence is determined based on a physical cell identifier and first timing information, and for a same physical cell identifier, a difference between two cyclic shift values of the first m-sequence that are separately determined based on the physical cell identifier and any two pieces of adjacent first timing information is L1, where L1 is a positive integer, and the first timing information includes a synchronization signal block time index or a first part of the synchronization signal block time index; and after modulating the generated reference signal sequence, mapping a modulated reference signal sequence to N subcarriers to obtain a reference signal, where N is a positive integer greater than or equal to 1.

32 Claims, 6 Drawing Sheets

(51) Int. Cl.
*H04L 27/26* (2006.01)
*H04J 13/00* (2011.01)
*H04J 11/00* (2006.01)

(52) U.S. Cl.
CPC ............ *H04L 5/005* (2013.01); *H04L 5/0007* (2013.01); *H04L 27/2627* (2013.01); *H04W 56/001* (2013.01); *H04L 5/0091* (2013.01)

(56) References Cited

FOREIGN PATENT DOCUMENTS

CN 104426830 A 3/2015
EP 3057252 A1 8/2016

OTHER PUBLICATIONS

"3rd Generation Partnership Project; Technical Specification Group Radio Access Network; Study on New Radio (NR) access technology (Release 14)", 3GPP Standard; Technical Specification; 3GPP TR 38.912, vol. TSG RAN, No. V14.1.0, Aug. 3, 2017, pp. 1-74,XP051336695.
"3rd Generation Partnership Project;Technical Specification Group Radio Access Network; NR; Medium Access Control (MAC) protocol specification (Release 15)", 3GPP TS 38.321 V0.2.0 (Aug. 2017), total 36 pages.
Intel Corporation ,"[NRAH2-05] Email discussion on DMRS Sequence for NR PBCH", 3GPP TSG RAN WG1 #90 Meeting, R1-1712265, Prague, Czech Republic, Aug. 21-25, 2017, total 24 pages.
LG Electronics, "Discussion on DMRS design for NR-PBCH ", 3GPP TSG RAN WG1 Meeting NR#2, R1-1710264, Qingdao, P.R. China, Jun. 27-30, 2017, total 7 pages.
LG Electronics, "Discussion on SS block time index indication", 3GPP TSG RAN WG1 NR Ad-Hoc #2, R1-1710260, Qingdao, P.R. China, Jun. 27-30, 2017, total 7 pages.
MediaTek Inc. "Further discussion on SS block index indication", 3GPP TSG RAN WG1 Meeting Ad-Hoc #2, R1-1710799, Qingdao, P.R. China, Jun. 27-30, 2017, total 3 pages.
ZTE, "Timing indication based on SS blocks", 3GPP TSG RAN WG1 NR Ad-Hoc #2, R1-1709886, Qingdao, P.R. China, Jun. 27-30, 2017, total 7 pages.
NTT Docomo et al: "Discussion on timing indication based on SS block for NR", 3GPP TSG RAN WG1 NR Ad-Hoc#2, R1-1711058, Qingdao, P.R. China, Jun. 27-30, 2017, 12 pages.
NTT Docomo et al: "Discussion on sequence design of DMRS for NR-PBCH", 3GPP TSG RAN WG1 NR Ad-Hoc#2, R1-1711062, Qingdao, P.R. China; Jun. 27-30, 2017, 4 pages.
Qualcomm Incorporated: "SS block and SS burst set composition consideration", 3GPP TSG-RAN WG1 NR R1-1708569, Hangzhou, P.R. China, May 15-19, 2017, 6 pages.
3GPP TS 36.211, V14.3.0 (Jun. 2017), Release 14, 80 pages.

\* cited by examiner

SIGNAL PROCESSING METHOD AND APPARATUS

CROSS-REFERENCE TO RELATED APPLICATIONS

This application is a continuation of International Application No. PCT/CN2018/099625, filed on Aug. 9, 2018 and claims priority to Chinese Patent Application No. 201710687513.8, filed on Aug. 11, 2017. The disclosures of the aforementioned applications are hereby incorporated by reference in their entireties

TECHNICAL FIELD

This application relates to the field of communications technologies, and in particular, to a signal processing method and apparatus.

BACKGROUND

In a Long Term Evolution (LTE) technology, cell search starts in a synchronization process, and in the synchronization process, two specially designed physical signals that are broadcast by each cell are used: a primary synchronization signal (PSS) and a secondary synchronization signal (SSS). A terminal device is synchronized with the cell in terms of time and frequency by detecting the two physical signals. In an initial synchronization process after the synchronization signals are detected, the terminal decodes a physical broadcast channel (PBCH) to obtain system information, and the system information mainly includes a master information block (MIB) and a system information block (SIB).

Currently, a concept of a synchronization signal block (SS block) is defined in a 5G new radio (NR) technology, and an SS block includes a PSS, an SSS, and a PBCH. The PBCH occupies 24 resource blocks (RB) in frequency domain, and the PSS and the SSS each occupy 12 RBs in the middle of minimum receiving bandwidth of the terminal device. The PBCH occupies two symbols in time domain. A demodulation reference signal (DMRS) is used as a reference signal of the PBCH, and the reference signal needs to be designed.

SUMMARY

This application provides a signal processing method and apparatus, to design a reference signal.

According to a first aspect, an embodiment of this application provides a signal processing method. The method includes generating a reference signal sequence of a physical channel based on a first m-sequence and a second m-sequence. The reference signal sequence is a gold sequence. The reference signal sequence is related to a physical cell identifier and first timing information, and the first timing information includes a synchronization signal block time index or a first part of the synchronization signal block time index. The method further includes after modulating the generated reference signal sequence, mapping a modulated reference signal sequence to N subcarriers to obtain a reference signal, where N is a positive integer greater than or equal to 1.

In a possible design, the method further includes: sending the reference signal on the N subcarriers.

In a possible design, the method further includes: obtaining the physical cell identifier and the first timing information by using an initialized value of the reference signal sequence or a cyclic shift value of the reference signal sequence.

In a possible design, the method further includes: obtaining the first timing information by using an information bit of the physical channel.

In a possible design, the first timing information further includes half-frame indication information.

In a possible design, the reference signal sequence of the physical channel includes a demodulation reference signal DMRS sequence of the physical channel.

In a possible design, the physical channel includes a physical broadcast channel.

In a possible design, a carrier frequency band of the N subcarriers is a frequency band less than or equal to 3 GHz.

According to a second aspect, an embodiment of this application provides a signal processing method. The signal processing method includes obtaining a reference signal of a physical channel. A reference signal sequence corresponding to the reference signal is a gold sequence. The signal processing method further includes obtaining a physical cell identifier and first timing information based on the reference signal sequence, where the first timing information includes a synchronization signal block time index or a first part of the synchronization signal block time index.

In a possible design, the method further includes receiving the reference signal on N subcarriers, where N is a positive integer greater than or equal to 1.

In a possible design, the obtaining a physical cell identifier and first timing information based on the reference signal sequence includes: obtaining the physical cell identifier and the first timing information based on an initialized value of the reference signal sequence or a cyclic shift value of the reference signal sequence.

In a possible design, the first timing information further includes half-frame indication information.

In a possible design, the reference signal sequence includes a demodulation reference signal DMRS sequence of the physical channel.

In a possible design, the obtaining a physical cell identifier and first timing information based on the reference signal sequence includes: obtaining the first timing information by using an information bit of the physical channel.

In a possible design, the physical channel includes a physical broadcast channel.

In a possible design, a carrier frequency band of the N subcarriers is a frequency band less than or equal to 3 GHz.

According to a third aspect, an embodiment of this application provides a communications apparatus. The communications apparatus includes a generation unit, configured to generate a reference signal sequence of a physical channel based on a first m-sequence and a second m-sequence. The reference signal sequence is a gold sequence, the reference signal sequence is related to a physical cell identifier and first timing information, and the first timing information includes a synchronization signal block time index or a first part of the synchronization signal block time index. The communications apparatus further includes a mapping unit, configured to: after modulating the generated reference signal sequence, map a modulated reference signal sequence to N subcarriers to obtain a reference signal, where N is a positive integer greater than or equal to 1.

In a possible design, the communications apparatus further includes a sending unit, configured to send the reference signal on the N subcarriers.

In a possible design, the generation unit is configured to obtain the physical cell identifier and the first timing information by using an initialized value of the reference signal sequence or a cyclic shift value of the reference signal sequence.

In a possible design, the generation unit is configured to obtain the first timing information by using an information bit of the physical channel.

In a possible design, the first timing information further includes half-frame indication information.

In a possible design, the reference signal sequence includes a demodulation reference signal DMRS sequence of the physical channel.

In a possible design, the physical channel includes a physical broadcast channel.

In a possible design, a frequency band of the N subcarriers is a frequency band less than or equal to 3 GHz.

According to a fourth aspect, an embodiment of this application provides a communications apparatus. The communications apparatus includes a receiving unit, configured to obtain a reference signal of a physical channel. A reference signal sequence corresponding to the reference signal is a gold sequence. The communications apparatus further includes an obtaining unit, configured to obtain a physical cell identifier and first timing information based on the reference signal sequence, where the first timing information includes a synchronization signal block time index or a first part of the synchronization signal block time index.

In a possible design, the receiving unit is specifically configured to receive the reference signal on N subcarriers, where N is a positive integer greater than or equal to 1.

In a possible design, the obtaining unit is configured to obtain the physical cell identifier and the first timing information by using an initialized value of the reference signal sequence or a cyclic shift value of the reference signal sequence.

In a possible design, the obtaining unit is configured to obtain the first timing information by using an information bit of the physical channel.

In a possible design, the first timing information further includes half-frame indication information.

In a possible design, the reference signal sequence includes a demodulation reference signal DMRS sequence of the physical channel.

In a possible design, the physical channel includes a physical broadcast channel.

In a possible design, a carrier frequency band of the N subcarriers is a frequency band less than or equal to 3 GHz.

According to a fifth aspect, an embodiment of this application further provides a base station, and the base station includes a transceiver, a memory, and a processor. The memory stores a software program. The transceiver is configured to transmit and receive data. The processor is configured to: invoke and execute the software program stored in the memory, and transmit and receive data by using the transceiver, to implement the method according to any design in the first aspect.

According to a sixth aspect, an embodiment of this application further provides a terminal device. The terminal device includes a transceiver, a memory, and a processor. The memory stores a software program. The transceiver is configured to transmit and receive data. The processor is configured to invoke and execute the software program stored in the memory, and transmit and receive data by using the transceiver, to implement the method according to any design in the second aspect.

According to a seventh aspect, an embodiment of this application further provides a chip. The chip is connected to a memory, and is configured to read and execute a software program stored in the memory, to implement the method according to any design in the first aspect or any design in the second aspect.

According to an eighth aspect, an embodiment of this application further provides a communications system, including the base station according to the fifth aspect and the terminal device according to the sixth aspect.

According to a ninth aspect, an embodiment of this application further provides a computer storage medium. The storage medium stores a software program. When being read and executed by one or more processors, the software program may implement the method provided in any design in the first aspect or the second aspect.

According to a tenth aspect, an embodiment of this application provides a computer program product including an instruction. When the computer program product runs on a computer, the computer is enabled to perform the method provided in any design in the first aspect or the second aspect.

DETAILED DESCRIPTION OF ILLUSTRATIVE EMBODIMENTS

Figure 1:
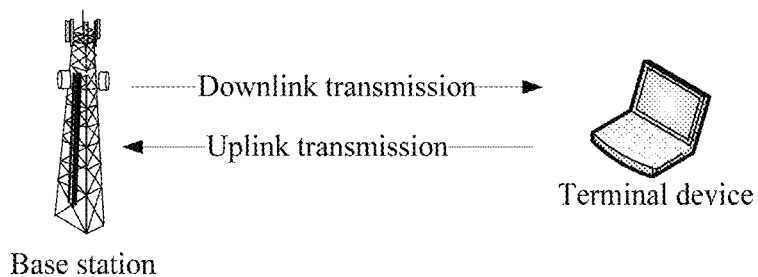
FIG. 1 is an architectural diagram of an NR system according to an embodiment of this application.

Embodiments of this application may be applied to a wireless communications system, such as an LTE system, a WCDMA system, and an NR system. Subsequently, that the embodiments of this application are applied to the NR system is used as an example. Referring to FIG. 1, the NR system includes a base station and a terminal device.

For ease of subsequent description, some terms in this application are first explained and described, to facilitate understanding by a person skilled in the art.

A method in the embodiments of this application may be performed by a communications apparatus, and the communications apparatus may be located in a base station, for example, is a processing chip on the base station; or the communications apparatus may be located in a terminal device, for example, is a processing chip on the terminal device.

A base station (for example, an access point) in the embodiments of this application may be a device that is in an access network and that communicates with a terminal device over an air interface by using at least one sector. The base station may further coordinate attribute management of the air interface. For example, the base station may be an evolved NodeB in LTE, or a gNodeB (gNB) or an access point in an NR system, and this is not limited in the embodiments of this application. It should be noted that the base station described in the embodiments of this application may be a base station device, or may be a relay device, or another network element device with a base station function.

The terminal device may be a wireless terminal or a wired terminal. The wireless terminal may be a device that provides voice and/or data connectivity for a user, a handheld device with a wireless connection function, or another processing device connected to a wireless modem. The wireless terminal may communicate with at least one core network by using a radio access network (RAN for short). The wireless terminal may be a mobile terminal, such as a mobile phone (or referred to as a "cellular" phone) or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS for short) phone, a cordless telephone set, a Session Initiation Protocol (SIP for short) phone, a wireless local loop (WLL for short) station, or a personal digital assistant (PDA for short). The wireless terminal may also be referred to as a system, a subscriber unit (SU for short), a subscriber station (SS for short), a mobile station (MB for short), a mobile console, a remote station (RS for short), an access point (AP for short), a remote terminal (RT for short), an access terminal (AT for short), a user terminal (UT for short), a user agent (UA for short), a terminal device (UD for short), or user equipment (UE for short).

"Plurality" in the embodiments of this application means "at least two".

A mathematical symbol $\lfloor \ \rfloor$ in the embodiments of this application means rounding down, for example, if A=3.9, $\lfloor A \rfloor$=3; and a mathematical symbol $\lceil \ \rceil$ means rounding up, for example, if B=3.1, $\lceil B \rceil$=4.

Two adjacent physical cell identifiers in the embodiments of this application are two consecutive physical cell identifiers obtained after values of physical cell identifiers are sorted in descending order or in ascending order. Likewise, two pieces of adjacent timing information are two pieces of consecutive timing information obtained after values used to represent timing information are sorted in descending order or in ascending order.

In addition, it should be understood that in the descriptions of this application, words "first", "second", and the like are merely used for distinguished description, and shall not be understood as an indication or implication of relative importance or an indication or implication of an order.

An m-sequence in the embodiments of this application is a short term for longest linear shift register sequence. A generator polynomial of the m-sequence is $g(x)=\sum_{i=0}^{K} a_i \cdot x^i$, where $a_K=1, a_0=1$. A sequence generated based on the g(x) representation may be represented by $\{c(n)|n=0, 1, 2, \ldots, N-1\}$, where c(n) meets the following recursion relationship: $c((n+K)\bmod N)=(\sum_{i=1}^{K-1} a_i \cdot c((n+1)\bmod N)+c(n))\bmod 2$, where n=0, 1, 2, . . . , N−1, and K represents an original length of a shift register. An initial state is c(K−1), c(K−2), c(K−3), . . . , c(1), c(0). A sequence $\{c(n)|=0, 1, 2, \ldots, N-1\}$ may be obtained based on the initial state and the recursion formula. When the generator polynomial is a K degree primitive polynomial, an obtained group of sequences is an m-sequence whose length is $N=2^K-1$. In a possible implementation, one of the sequences is used as an initial sequence, and other sequences are defined based on cyclic shift values relative to the initial sequence. A cyclic shift value of the m-sequence in the embodiments of this application is a quantity of bits that are cyclically shifted left or cyclically shifted right relative to the initial sequence (to be specific, an initial state of the shift register used for generating the m-sequence) used for generating the m-sequence. Therefore, the m-sequence may have N cyclic shift values, and correspond to N sequences. In another possible implementation, a sequence in the m-sequence may alternatively be defined by using a group of initial state values, namely, initialized values. The cyclic shift value or the initialized value may be referred to as a parameter of the m-sequence.

A gold sequence is a sequence generated by performing modulo-2 addition on m-sequences. $f_1((n+m+k)\bmod N)$, $f_2((n+k)\bmod N)$ are two m-sequences whose lengths are N, and $g_{m,k}(n)=(f_1((n+m+k)\bmod N)+f_2(n+k)\bmod N))\bmod 2$. $g_{m,k}(n)$ represents a gold sequence whose length is N, where m,k=0, 1, 2, . . . , N−1, and $N=2^K-1$.

The NR defines that an SS block includes a PSS, an SSS, and a PBCH. The PBCH occupies 24 RBs in frequency domain, and the PSS and the SSS each occupy 12 RBs in the middle of minimum receiving bandwidth of a terminal device.

An SSS sequence has a length of 127, and may be a gold sequence generated by using two m-sequences. Cyclic shift values $m_0$ and $m_1$ of the two m-sequences corresponding to the gold sequence may be respectively represented as:

$$m_0 = \left(\left(3\left\lfloor\frac{N_{ID}^{(1)}}{112}\right\rfloor + N_{ID}^{(2)}\right) \cdot 5\right) \bmod 127 \quad \text{formula (1)}$$

$$m_1 = (N_{ID}^{(1)} \bmod 112) \quad \text{formula (2)}$$

Herein, a value range of $N_{ID}^{(1)}$ is 0, 1, . . . , 335, and a value range of $N_{ID}^{(2)}$ is 0, 1, 2. $N_{ID}^{(1)}$ and $N_{ID}^{(2)}$ together represent an assumption of 1008 types of physical cell identifiers (for example, physical cell IDs).

$$3\left\lfloor\frac{N_{ID}^{(1)}}{112}\right\rfloor + N_{ID}^{(2)}$$

in the formula (1) may be referred to as $N_{cell}^{ID}$. $N_{cell}^{ID}$ is corresponding to a physical cell identifier, and may also be referred to as an equivalent physical cell identifier (ID), and a value range of $N_{cell}^{ID}$ may be 0 to 8.

The PBCH occupies two symbols in time domain. A reference signal of the PBCH may be a DMRS, a DMRS sequence depends on at least a physical cell ID and a synchronization signal block time index (SS block time index) value, and the DMRS sequence is mapped to each PBCH symbol. Both the physical cell ID and the SS block time index information may be carried in a parameter of the DMRS sequence of the PBCH, for example, an initialized value or a cyclic shift value.

Generator polynomials of two m-sequences used for the DMRS sequence of the PBCH may be respectively the same as generator polynomials of two m-sequences used for an SSS sequence. For example, the generator polynomials of the SSS sequence are $x^7+x^4+1$ and $x^7+x+1$, and therefore the generator polynomials of the two m-sequences for the DMRS sequence are $x^7+x^4+1$ and $x^7+x+1$.

The DMRS sequence is a gold sequence, and parameters of the two m-sequences for the DMRS sequence may be represented as $m_0$ and $m_1$. Therefore, both the physical cell ID and the SS block time index information may be carried in a parameter of the DMRS sequence of the PBCH, for example, a cyclic shift value or an initialized value. Adding to-be-transmitted information to a cyclic shift value and adding to-be-transmitted information to an initialized value are essentially equivalent. Therefore, the physical cell ID and the SS block time index information may be carried in the cyclic shift value of the DMRS sequence of the PBCH, or may be carried in the initialized value of the DMRS sequence of the PBCH.

In a possible implementation, $m_0$ and $m_1$ are used as examples of the cyclic shift value. A common manner of adding the physical cell ID and the SS block time index information to the cyclic shift value is:

$$m_0 = 8 \cdot \lfloor N_{ID}^{cell}/127 \rfloor + N_{ID}^{SSblock}$$

$$m_1 = N_{ID}^{cell} \bmod 127 \quad \text{formula (3-1)}$$

Herein, $N_{ID}^{cell}$ represents an actual physical cell ID, and $N_{ID}^{SSblock}$ represents an SS block time index. Optionally, a value range of $N_{ID}^{cell}$ is $0, 1, \ldots, 1007$, and a value range of $N_{ID}^{SSblock}$ is $0, 1, \ldots, 7$. $N_{ID}^{cell}$ represents the actual physical cell ID, and is also an identifier corresponding to the physical cell identifier.

In another possible implementation, $m_0$ and $m_1$ are used as examples of the cyclic shift value. A common manner of adding the physical cell ID and the SS block time index information to the cyclic shift value is:

$$m_0 = \left(\left(3\left\lfloor \frac{N_{ID}^{(1)}}{112} \right\rfloor + N_{ID}^{(2)} + 9 * N_{ID}^{SSblock}\right) * 5\right) \bmod 127 \quad \text{formula (1)}$$

$$m_1 = (N_{ID}^{(1)} \bmod 112) \quad \text{formula (2)}$$

where $$3\left\lfloor \frac{N_{ID}^{(1)}}{112} \right\rfloor + N_{ID}^{(2)}$$

is equivalent to $N_{cell}^{ID}$, and may also be referred to as an equivalent physical cell ID.

Based on the foregoing formula (3-2), a set of cyclic shift values $m_0$ for nine possible equivalent physical cell IDs (0 to 8) may be:

0, 45, 90, 8, 53, 98, 16, 61; //which are values of $m_0$ when the equivalent physical cell ID is 0, in other words, $N_{cell}^{ID}=0$, and $N_{ID}^{SSblock}$ is respectively 0 to 7;

5, 50, 95, 13, 58, 103, 21, 66; //which are values of $m_0$ when the equivalent physical cell ID is 1, in other words, $N_{cell}^{ID}=1$, and $N_{ID}^{SSblock}$ is respectively 0 to 7;

10, 55, 100, 18, 63, 108, 26, 71; //which are values of $m^0$ when the equivalent physical cell ID is 2, in other words, $N_{cell}^{ID}=2$, and $N_{ID}^{SSblock}$ is respectively 0 to 7;

. . . ; and 40, 85, 3, 48, 93, 11, 56, 101//which are values of $m_0$ when the equivalent physical cell ID is 8, in other words, $N_{cell}^{ID}=8$, and $N_{ID}^{SSblock}$ is respectively 0 to 7.

For example, the physical cell ID is equal to 0, and differences between two adjacent cyclic shift values are respectively 45, 45, 72, 45, 45, 82, and 45. Therefore, it may be learned that, when the physical cell ID is equal to 0, cyclic shift values $m^0$ of an m-sequence are unevenly distributed. Likewise, for another physical cell ID, cyclic shift values $m_0$ of an m-sequence are also unevenly distributed. In addition, an interval between two cyclic shift values is relatively small, for example, an interval is only 1 between 100 and 101, and therefore detection performance of the PBCH DMRS and detection performance of the PBCH deteriorate.

Figure 2A:
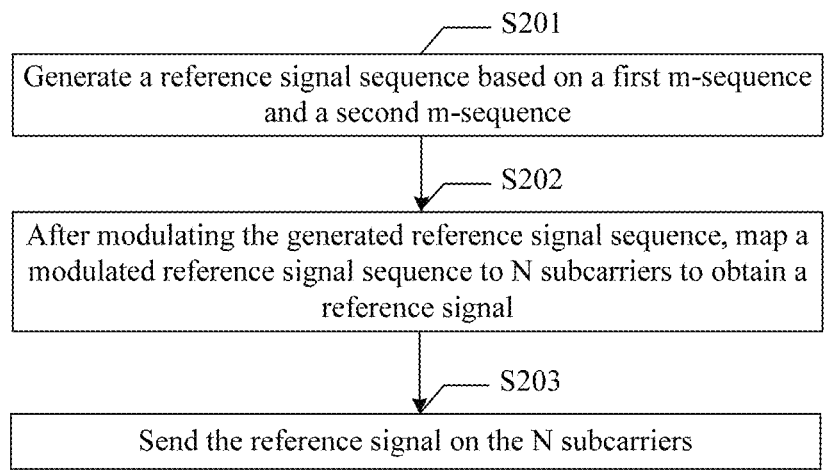
FIG. 2A and FIG. 2B are flowcharts of a signal processing method according to an embodiment of this application.

Based on this, an embodiment of this application provides a signal processing method. As shown in FIG. 2A, the method may be performed by a communications apparatus, and the communications apparatus may be deployed on a base station. The method includes the following steps.

S201: Generate a reference signal sequence based on a first m-sequence and a second m-sequence.

The reference signal sequence is a gold sequence. A cyclic shift value of the first m-sequence is determined based on a physical cell identifier and first timing information. For a same physical cell identifier, a difference between two cyclic shift values of the first m-sequence that are separately determined based on the physical cell identifier and any two pieces of adjacent first timing information is L1, where L1 is a positive integer. The first timing information includes a synchronization signal block time index (SS block time index) or a first part of a synchronization signal block time index.

Optionally, the synchronization signal block time index may include two pails. A first part is used to indicate a group number of a synchronization signal block, and a second part is used to indicate a location of the synchronization signal block in a synchronization signal block group.

S202: After modulating the generated reference signal sequence, map a modulated reference signal sequence to N subcarriers to obtain a reference signal, where N is a positive integer greater than or equal to 1.

According to the foregoing solution, the physical cell identifier and the first timing information are carried in the cyclic shift value of the m-sequence used for generating the reference signal sequence, and for a same physical cell identifier, difference between two cyclic shift values of the first m-sequence that are separately determined based on the physical cell identifier and any two pieces of first timing information keeps same, so that cyclic shift values $m_0$ of the m-sequence are relatively evenly distributed, and therefore detection performance of a PBCH DMRS and detection performance of a PBCH can be improved.

Further, the method may further include S203: Send the reference signal on the N subcarriers.

Optionally, for same first timing information, a difference between cyclic shift values determined based on any two adjacent physical cell identifiers is L2, where L2 is a positive integer.

Optionally, a generator polynomial of the first m-sequence is the same as a generator polynomial of one of two m-sequences used for generating a synchronization signal sequence, and a generator polynomial of the second m-sequence is the same as a generator polynomial of the other one of the two m-sequences used for generating the synchronization signal sequence. For example, the generator polynomial of the first m-sequence and the generator polynomial of the second m-sequence are $x^7+x^4+1$ and $x^7+x+1$ respectively.

Specifically, the synchronization signal sequence may be a secondary synchronization signal sequence SSS. The synchronization signal sequence may be generated during generation of the reference signal sequence, or may be generated before the reference signal sequence is generated, and this is not specifically limited in this application. The reference signal sequence in this embodiment of this application may be a DMRS sequence applied to a PBCH, and the DMRS sequence is distributed in bandwidth of the PBCH with specific density. Bandwidth occupied by the PBCH in frequency domain is 24 RBs, and DMRS sequence density may be ¼. In addition, because the PBCH occupies two symbols in time domain, bandwidth of the PBCH on each symbol includes 72 resource elements (RE) used for mapping the DMRS sequence, and therefore bandwidth of the PBCH on the two symbols includes 144 resource elements used for mapping the DMRS sequence.

Therefore, that the communications apparatus maps, after modulating the generated reference signal sequence, the modulated reference signal sequence to the N subcarriers to obtain the reference signal may be specifically implemented in the following manner:

After modulating the generated reference signal sequence, the communications apparatus may map the modulated reference signal sequence to N subcarriers of a first time unit. A value of N is a positive integer. For example, the value of N may be 72, 127, 144, or 255. The first time unit occupies two symbols in time domain.

After modulating a generated synchronization signal sequence, the communications apparatus may map a modulated synchronization signal sequence to M subcarriers of a second time unit to obtain a synchronization signal. A value of M is a positive integer. For example, the value of M is 127 or 255. The second time unit may occupy one symbol in time domain.

Based on this, the communications apparatus may send the synchronization signal together with the reference signal, or may send the synchronization signal before sending the reference signal.

Figure 2B:
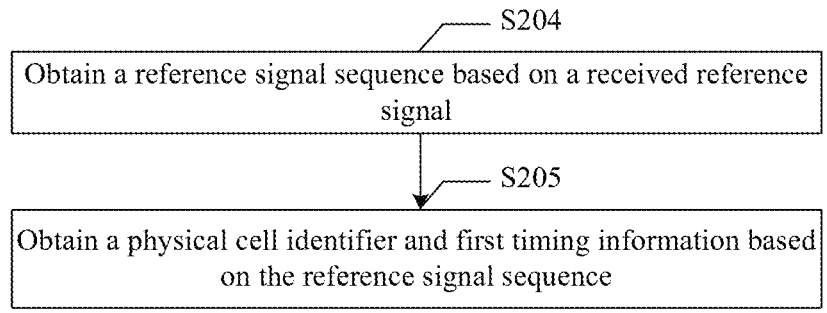

After receiving the reference signal, a communications apparatus on a receive side may determine the physical cell identifier and the first timing information based on the reference signal. For example, the communications apparatus on the receive side may be deployed on a terminal device, and the communications apparatus on the receive side may perform the following method. Referring to FIG. 2B, the method includes the following steps:

S204: Obtain the reference signal sequence based on the received reference signal.

S205: Obtain the physical cell identifier and the first timing information based on the reference signal sequence.

In this embodiment, the reference signal sequence has a corresponding feature of the reference signal sequence in the foregoing method embodiment.

The reference signal sequence in the embodiments of this application may be a DMRS sequence applied to a PBCH. A DMRS sequence of a PBCH is used as an example below to specifically describe this embodiment of this application.

In LTE, the PBCH occupies four symbols in time domain, and occupies six RBs in frequency domain. Eight REs on first two symbols in time domain are reserved for a cell-specific reference signal (CRS) sequence. The CRS sequence is usually generated by a 31-bit shift register, and a length of a pseudo-random sequence (PN) generated by the 31-bit shift register is $2^{31}-1$. According to a system requirement, the CRS sequence may be a sequence segment of a required length that is truncated from the PN sequence whose length is $2^{31}-1$.

In NR, because bandwidth of a PBCH with two symbols includes 144 resource elements used for mapping a DMRS sequence, the DMRS sequence of the PBCH may be generated by a shift register with less than 31 bits. For example, a PN sequence whose sequence length is $2^{7-1}=127$ is formed based on a shift register whose length is 7, the PN sequence whose length is 127 is mapped to 127 resource elements of the DMRS sequence sequentially, and then cyclic mapping is performed on remaining 17 resource elements. The PN sequence is used as the DMRS sequence of the PBCH. The PN sequence is a gold sequence including two m-sequences:

$$g_m(n)=(f_1((n+0) \bmod N)+f_2((n+m_1) \bmod N)) \bmod 2;$$

where $m=0, 1, 2, \ldots, N-1$, $f_1((n+m_0) \bmod N)$ represents a first m-sequence, $f_2((n+m_1) \bmod N)$ represents a second m-sequence, $m_0$ represents a cyclic shift value of the first m-sequence used for generating the gold sequence, and $m_1$ represents a cyclic shift value of the second m-sequence used for generating the gold sequence. A total of 8064 assumptions, to be specific, 1008 assumptions corresponding to cell ID information and eight assumptions corresponding to the SS block time index, may be carried in a value of $m_0$ and a value of $m_1$ together.

Therefore, the cyclic shift value $m_0$ of the first m-sequence may meet one of a formula (4) and a formula (5):

$$m_0=((N_{cell}^{ID}+a*SS\_block\_idx)*b) \bmod c \quad \text{formula (4)}$$

$$m^0=(b*N_{cell}^{ID}+d*SS\_block\_idx) \bmod c \quad \text{formula (5)}$$

where $N_{cell}^{ID}$ represents an equivalent physical cell ID, and the equivalent physical cell ID is cell identification information obtained after an actual physical cell ID is converted; SS_block_idx represents a synchronization signal block time index; and a, b, c, and d each are a non-zero integer, where c may be a sequence length of the first m-sequence or the reference signal sequence, and a, b, and d may be adjustment factors related to $N_{cell}^{ID}$, for example, a is a multiple of a maximum value of $N_{cell}^{ID}$, b is an adjustment factor that maximizes a difference between cyclic shift values of two adjacent cells in same first timing information, and $d=a \times b$.

The cyclic shift value $m_1$ of the second m-sequence may meet:

$$m_1=(N_{ID}^{(1)}) \bmod 112.$$

A value range of $N_{ID}^{(1)}$ is $0, 1, \ldots, 335$, and may be represented by cell ID group numbers that are obtained by grouping 1008 cell IDs, and one cell ID group includes three cell IDs (which are represented by $N_{ID}^{(2)}$).

The foregoing a, b, c, and d meet at least one of conditions shown in the following formula (6) and formula (7):

$$(d*SS\_block\_idx_{max}) \bmod c \leq c-b*N_{cell,max}^{ID} \quad \text{formula (6)}$$

$$d \bmod c \leq \lfloor c/SS\_block\_idx_{max} \rfloor \quad \text{formula (7)}$$

where SS_block_idx$_{max}$ is a maximum value in SS_block_idx, $N_{cell,max}^{ID}$ is a maximum value in $N_{cell}^{ID}$, mod represents a modulo operation, and $\lfloor \ \rfloor$ represents a rounding down operation.

In addition, the foregoing a, b, c, and d may alternatively meet at least one of conditions shown in the following formula (6') and formula (7'):

$$(a*b*SS\_block\_idx_{max}) \bmod c \leq c-b*N_{cell,max}^{ID} \quad \text{formula (6')}$$

$$(a*b) \bmod c \leq \lfloor c/SS\_block\_idx_{max} \rfloor \quad \text{formula (7')}$$

where SS_block_idx$_{max}$ is a maximum value in SS_block_idx, $N_{cell,max}^{ID}$ is a maximum value in $N_{cell}^{ID}$, mod represents a modulo operation, and $\lfloor \ \rfloor$ represents a rounding down operation.

Optionally, SS block time index indication information may be added based on that two m-sequences (which are gold sequences) for the SSS sequence have already carried cyclic shift values of cell IDs. Specifically, the SS block time index indication information is added based on the formula (1) and the formula (2). Specifically, when b is equal to 5 and c is equal to 127, $m_0$ and $m_1$ may be:

$$m_0 = \left(\left(3\left\lfloor\frac{N_{ID}^{(1)}}{112}\right\rfloor + N_{ID}^{(2)} + a*\text{SS\_block\_idx}\right)*5\right) \bmod 127 \quad \text{formula (8)}$$

$$m_1 = (N_{ID}^{(1)} \bmod 112) \quad \text{formula (9)}$$

A value of a is an integer that is not equal to 0. Specifically, the value of a cannot be set at random. For example, when $\lfloor a/9 \rfloor$ is equal to 12, a value set of $m^0$ in a same physical cell is {0, 32, 64, 96, 1, 33, 65, 97}, cyclic shift values of the first m-sequence in the cell are distributed unevenly, and there are some cyclic shift values with a relatively small interval (only 1). Consequently, detection performance of a PBCH DMRS and detection performance of the PBCH deteriorate.

To avoid this problem, for example, when the cyclic shift value $m_0$ of the first m-sequence carries nine of 1008 cell identifiers, a value range of information related to $N_{cell}^{ID}$ in $m_0$ is 0, 1, 2, 3, 4, 5, 6, 7, 8. In other words, in the formula (6) and the formula (6'), $N_{cell,max}^{ID}=8$. When there are eight possibilities for a value of SS_block_idx, a value range of SS_block_idx is 0, 1, 2, 3, 4, 5, 6, 7, and SS_block_$idx_{max}=7$. The foregoing values are separately substituted into the formula (6) and the formula (7), to determine that a value of a in the formula (8) needs to meet at least one of the following:

(a*5*7)mod 127≤87

(a*5)mod 127≤18

For example, the value range of a includes {27, 54, 180, 306, 333, 432}.

The value of a in $m_0$ is set, so that it can be ensured that values of $m_0$ in all cells are not the same, cyclic shift values in all the cells are distributed as evenly as possible, and a cyclic shift value interval in each cell is large enough.

For example, when a=27, $$m_0 = \left(\left(3\left\lfloor\frac{N_{ID}^{(1)}}{112}\right\rfloor + N_{ID}^{(2)} + 27*\text{SS\_block\_idx}\right)*5\right) \bmod 127.$$

Therefore, the value of $m_0$ is:
{0, 8, 16, 24, 32, 40, 48, 56; //which are values of $m_0$ when the equivalent physical cell ID is 0, in other words, $$3\left\lfloor\frac{N_{ID}^{(1)}}{112}\right\rfloor + N_{ID}^{(2)} = 0,$$

and SS_block_idx is respectively 0 to 7;
5, 13, 21, 29, 37, 45, 53, 61; //which are values of $m_0$ when the equivalent physical cell ID is 1 and SS_block_idx is respectively 0 to 7;
10, 18, 26, 34, 42, 50, 58, 66; //which are values of $m_0$ when the equivalent physical cell ID is 2 and SS_block_idx is respectively 0 to 7;
. . . ; and
40, 48, 56, 64, 72, 80, 88, 96}//which are values of $m_0$ when the equivalent physical cell ID is 8 and SS_block_idx is respectively 0 to 7.

It can be learned from the foregoing descriptions that, when a=27, for a same equivalent physical cell ID, an $m_0$ difference between two adjacent SS block time indexes is 8 (in other words, an interval is 8), and for a same SS block time index, an $m_0$ difference between two adjacent equivalent physical cell IDs is 5 (in other words, an interval is 5). In addition, a minimum interval between cyclic shift values is 8, and an interval between cyclic shift values cannot be 1.

For example, when a=54, $$m_0 = \left(\left(3\left\lfloor\frac{N_{ID}^{(1)}}{112}\right\rfloor + N_{ID}^{(2)} + 54*\text{SS\_block\_idx}\right)*5\right) \bmod 127.$$

Therefore, the value of $m_0$ id:
{0, 16, 32, 48, 64, 80, 96, 112; //which are values of $m_0$ when the equivalent physical cell ID is 0 and SS_block_idx is respectively 0 to 7;
5, 21, 37, 53, 69, 85, 101, 117; //which are values of $m_0$ when the equivalent physical cell ID is 1 and SS_block_idx is respectively 0 to 7;
10, 26, 42, 58, 74, 90, 106, 122; //which are values of $m_0$ when the equivalent physical cell ID is 2 and SS_block_idx is respectively 0 to 7;
. . . ; and
40, 56, 72, 88, 104, 120, 136, 152}//which are values of $m_0$ when the equivalent physical cell ID is 8 and SS_block_idx is respectively 0 to 7.

It can be learned from the foregoing descriptions that, when a=54, for a same equivalent physical cell ID, an $m_0$ difference between two adjacent SS block time indexes is 16, and for a same SS block time index, an $m_0$ difference between two adjacent equivalent physical cell IDs is 5.

For example, when a=180, $$m_0 = \left(\left(3\left\lfloor\frac{N_{ID}^{(1)}}{112}\right\rfloor + N_{ID}^{(2)} + 180*\text{SS\_block\_idx}\right)*5\right) \bmod 127.$$

Therefore, the value of $m_0$ is:
{0, 11, 22, 33, 44, 55, 66, 77; //which are values of $m_0$ when the equivalent physical cell ID is 0 and is respectively 0 to 7;
5, 16, 27, 38, 49, 60, 71, 82; //which are values of $m_0$ when the equivalent physical cell ID is 1 and SS_block_idx is respectively 0 to 7;
10, 21, 32, 43, 54, 65, 76, 87; //which are values of $m_0$ when the equivalent physical cell ID is 2 and SS_block_idx is respectively 0 to 7;
. . . ; and
40, 51, 62, 73, 84, 95, 106, 117}//which are values of $m_0$ when the equivalent physical cell ID is 8 and SS_lock_idx is respectively 0 to 7.

It can be learned from the foregoing descriptions that, when a=180, for a same equivalent physical cell ID, an $m_0$ difference between two adjacent SS block time indexes is 11 (in other words, an interval is 11), and for a same SS block time index, an $m_0$ difference between two adjacent equivalent physical cell IDs is 5 (in other words, an interval is 5).

For example, when a=306, $$m_0 = \left(\left(3\left\lfloor\frac{N_{ID}^{(1)}}{112}\right\rfloor + N_{ID}^{(2)} + 9*34*SS\_block\_idx\right)*5\right) \bmod 127.$$

Therefore, the value of $m_0$ is:

{0, 14, 28, 42, 56, 70, 84, 98; //which are values of $m_0$ when the equivalent physical cell ID is 0 and SS_block_idx is respectively 0 to 7;

5, 19, 33, 47, 61, 75, 89, 103; //which are values of $m_0$ when the equivalent physical cell ID is 1 and SS_block_idx is respectively 0 to 7;

10, 24, 38, 52, 66, 80, 94, 108//which are values of $m_0$ when the equivalent physical cell ID is 2 and SS_block_idx is respectively 0 to 7;

. . . ; and 40, 54, 68, 82, 96, 110, 124}//which are values of $m_0$ when the equivalent physical cell ID is 8 and SS_block_idx is respectively 0 to 7.

It can be learned from the foregoing descriptions that, when a=306, for a same equivalent physical cell ID, an $m_0$ difference between any two adjacent SS block time indexes is 14, and for a same SS block time index, an $m_0$ difference between any two adjacent equivalent physical cell IDs is 5.

In addition, expressions of $m_0$ and $m_1$ may alternatively be represented by using an actual physical cell ID, for example:

$m_0 = 8 \cdot c \cdot \lfloor N_{ID}^{cell}/126 \rfloor + SS\_block\_idx$ $m_1 = N_{ID}^{cell} \bmod 126;$ where c is any positive integer not equal to 0, and is not specifically limited in this application; and SS_block_idx represents a synchronization signal block time index.

Optionally, in this embodiment of this application, the first timing information may further include half-frame indication information, to be specific, when the first timing information includes both synchronization signal block time index information and the half-frame indication information, the cyclic shift value $m_0$ of the first m-sequence may meet one of a formula (10) and a formula (11).

$m_0 = ((N_{cell}^{ID} + a*(2*SS\_block\_idx + half\_frame\_index))*b) \bmod c$   formula (10)

$m_0 = (b*N_{cell}^{ID} + d*(2*SS\_block\_idx + half\ frame\ index)) \bmod c$   formula (11)

The foregoing a, b, c, and d meet at least one of conditions shown in the formula (6) and the formula (7). half_frame_index represents the half-frame indication information.

The half-frame indication information is used to determine an index number of a half-frame. To be specific, after one frame is divided into two half-frames, the half-frame indication information is used to indicate one of the two half-frames.

In the NR system, when a carrier frequency band is less than or equal to 6 GHz, the SS block time index information may be carried in a PBCH DMRS; or when a carrier frequency band is greater than 6 GHz, the SS block time index information is carried in a PBCH DMRS and an information bit that is of a PBCH and that is used to carry information (payload). Therefore, on different carrier frequency bands, a size of an information bit that is of the PBCH and that is used to carry the SS block time index information is not fixed, thereby increasing design complexity of the PBCH and detection complexity of UE. Based on this, an embodiment of this application further provides a signal processing method, to indicate SS block time index information. A base station may add an SS block time index to a PBCH DMRS and an information bit of a PBCH on any carrier frequency band.

Figure 3A:
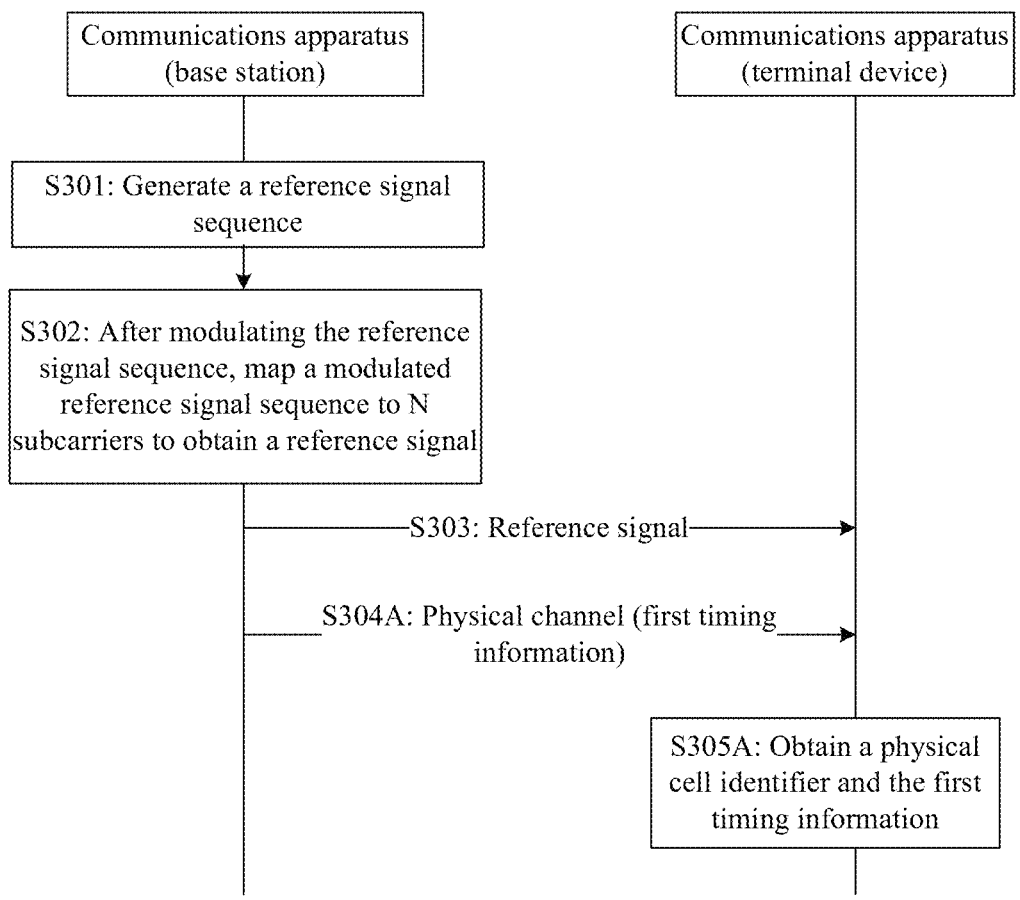
FIG. 3A and FIG. 3B are flowcharts of a signal processing method according to an embodiment of this application.
Figure 3B:
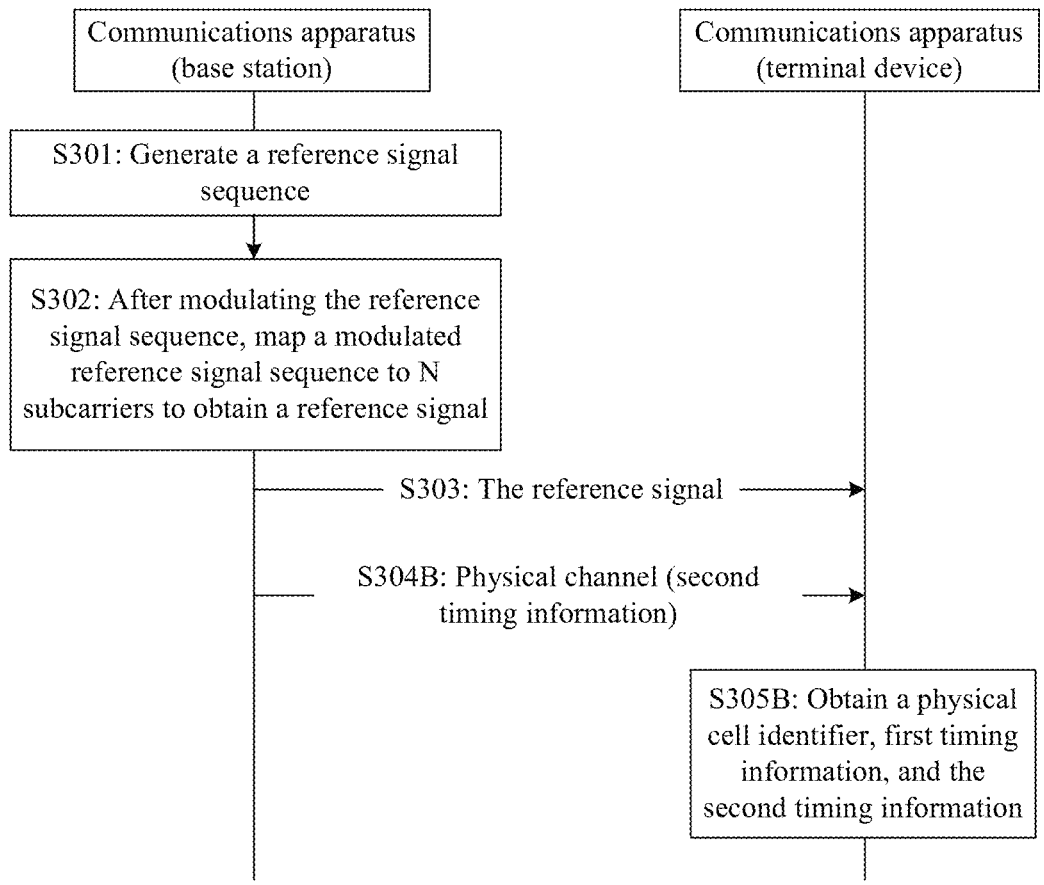

FIG. 3A and FIG. 3B are schematic flowcharts of a signal processing method according to an embodiment of this application. The method may be performed by a communications apparatus, and the communications apparatus may be deployed on a base station. The method includes the following steps.

S301: Generate a reference signal sequence based on a first m-sequence and a second m-sequence.

The reference signal sequence is a gold sequence. The reference signal sequence may be a DMRS sequence of a physical channel.

Timing information on a first carrier frequency band includes first timing information, or timing information on a second carrier frequency band includes the first timing information and second timing information. A cyclic shift value of the first m-sequence is determined based on a physical cell identifier and the first timing information. On the first carrier frequency band, the first timing information includes a synchronization signal block time index. On the second carrier frequency band, the first timing information includes a first part of the synchronization signal block time index. The second timing information includes a second part of the synchronization signal block time index. The first part is used to indicate a group number of a synchronization signal block, and the second part is used to indicate a location of the synchronization signal block in a synchronization signal block group.

Optionally, the first timing information may further include half-frame indication information, or the second timing information may include the half-frame indication information.

S302: After modulating the generated reference signal sequence, map a modulated reference signal sequence to N subcarriers to obtain a reference signal, where N is a positive integer greater than or equal to 1.

S303: Send the reference signal, and perform S304A or S304B, where the reference signal is a demodulation reference signal of the physical channel.

Referring to FIG. 3A, in S304A, on the first carrier frequency band, the first timing information is further carried in an information bit of the physical channel for transmission.

After receiving the reference signal and the physical channel, a communications apparatus on a receive side may determine the physical cell identifier and the first timing information based on the reference signal, and obtain the first timing information from the physical channel. The communications apparatus on the receive side may be deployed on a terminal device, and the communications apparatus on the receive side may perform S305A.

S305A: Receive the reference signal and the physical channel, obtain the physical cell identifier and the first timing information based on the reference signal, and obtain the first timing information from an information bit of the physical channel.

Referring to FIG. 3B, in S304B, on the second carrier frequency band, a communications apparatus on a transmit side adds the second timing information to an information bit of the physical channel for transmission.

After receiving the reference signal and the physical channel, a communications apparatus on a receive side may determine the physical cell identifier and the first timing information based on the reference signal, and obtain the second timing information from the physical channel. The communications apparatus on the receive side may specifically perform S305B.

S305B: Receive the reference signal and the physical channel, obtain the physical cell identifier and the first timing information based on the reference signal, and obtain the second timing information from the information bit of the physical channel.

A cyclic shift value of the first m-sequence may be determined based on the physical cell identifier and the first timing information by using implementations in the embodiments corresponding to FIG. 2A and FIG. 2B, and details are not described herein again.

The cyclic shift value of the first m-sequence may be specifically calculated based on a formula, for example, the formula (4) or the formula (5) in the embodiments corresponding to FIG. 2A and FIG. 2B. The cyclic shift value of the first m-sequence may alternatively be determined by using a correspondence. The correspondence represents a correspondence between the cyclic shift value, the physical cell identifier, and the first timing information. The correspondence may be stored on a base station in a table form, or stored on a base station in another manner.

The physical channel may be a PBCH.

According to the foregoing solution, on the first carrier frequency band, both the reference signal sequence (for example, a PBCH DMRS) and an information bit of the PBCH indicate the first timing information of the base station on the first carrier frequency band; and on the second carrier frequency band, the reference signal sequence (for example, the PBCH DMRS) indicates the first timing information, and the information bit of the PBCH indicates the second timing information of the base station on the second carrier frequency band. Therefore, on different carrier frequency bands, a same information bit of the PBCH is used to indicate SS block time index information, thereby ensuring that payloads of PBCHs are as equal as possible, and reducing design complexity of the PBCH and detection complexity of UE.

The first carrier frequency band and the second carrier frequency band may form all or some carrier frequency bands supported by the base station.

Optionally, the first carrier frequency band may be a frequency band less than or equal to 6 GHz, and the second carrier frequency band may be a frequency band greater than 6 GHz.

This embodiment of this application is specifically described with reference to specific application scenarios. For example, the first timing information and the second timing information are SS block time index information.

Case 1: When a carrier frequency band is less than or equal to 3 GHz, the first timing information includes SS block time index information. A bit quantity of the SS block time index information is 2.

Specifically, three bits may be explicitly carried in an information bit of a PBCH, and the three bits specifically include two-bit SS block time index information and one reserved bit.

During generation of a PBCH DMRS, the two-bit SS block time index information is implicitly carried in a DMRS sequence corresponding to the DMRS at the same time, and a cyclic shift value of an m-sequence used for generating the DMRS sequence is specifically determined based on the two-bit SS block time index information. A two-bit SS block time index value carried in the DMRS sequence corresponding to the DMRS is the same as the two-bit SS block time index information carried in the information bit of the PBCH.

A high bit in the two-bit SS block time index information is used to indicate an SS block group number, in other words, an SS block group index, and a low bit is used to indicate an index of an SS block in an SS block group. One SS block group may occupy one subframe (1 ms) or a half subframe (namely, one timeslot (slot), 0.5 ms) or several timeslots in time domain. The high bit is used to indicate the SS block group index, and indicates coarse-grained time information of a time interval (for example, one slot) longer than one SS block time interval (four symbols). The low bit indicates finer-grained time indication information (a location of an SS block in one slot).

Figure 4:
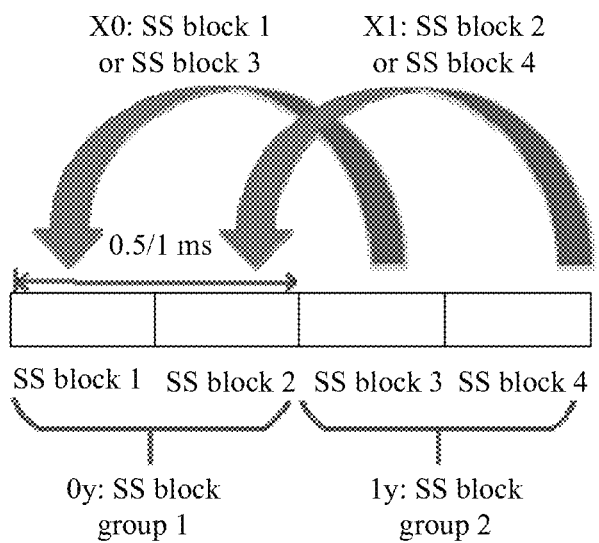
FIG. 4 is a schematic diagram of information carried in a synchronization signal block time index according to an embodiment of this application.

For example, as shown in FIG. 4, two SS block groups are included: an SS block group 1 and an SS block group 2. Each group includes two SS blocks. The SS block group 1 includes an SS block 1 and an SS block 2. The SS block group 2 includes an SS block 3 and an SS block 4. In FIG. 4, two bits are represented by using xy, where x indicates a high bit, and y indicates a low bit. It can be learned from FIG. 4 that when x is 0, the SS block group 1 is indicated; when x is 1, the SS block group 2 is indicated; when y is 0, the SS block 1 or the SS block 3 is indicated; when y is 1, the SS block 2 or the SS block 4 is indicated. Specifically, when x is 0 and y is equal to 0, the SS block 1 is indicated; when x is 0 and y is equal to 1, the SS block 2 is indicated; when x is 1 and y is equal to 0, the SS block 3 is indicated; when x is 1 and y is equal to 1, the SS block 4 is indicated.

A terminal device may obtain SS block time index information of a serving cell from an information bit of a PBCH of the serving cell, or from a PBCH DMRS of the serving cell. In a possible implementation, because it takes the terminal device a relatively long time to read PBCH information of a neighboring cell, to reduce detection complexity of the terminal device, the terminal device may obtain SS block time index information of the neighboring cell from a PBCH DMRS of the neighboring cell.

Case 2: When a carrier frequency band is greater than or equal to 3 GHz and less than or equal to 6 GHz, a bit quantity of SS block time index information is 3.

Specifically, three bits may be explicitly carried in an information bit of a PBCH, and the three bits specifically include three-bit SS block time index information.

During generation of a PBCH DMRS, the three-bit SS block time index information is implicitly carried in a DMRS sequence corresponding to the DMRS at the same time, and a cyclic shift value of an m-sequence used for generating the DMRS sequence is specifically determined based on the three-bit SS block time index information. The three-bit SS block time index information carried in the DMRS sequence corresponding to the PBCH DMRS is the same as the three-bit SS block time index information carried in the information bit of the PBCH.

Two high bits in the three-bit SS block time index information are used to indicate an SS block group number, in other words, an SS block group index, and one low bit is used to indicate an index of an SS block in an SS block group. One SS block group may occupy one subframe (1 ms) or a half subframe (namely, one timeslot (slot), 0.5 ms) or several timeslots in time domain. The two high bits are used to indicate the SS block group index, and indicate coarse-grained time information of a time interval (for example, one slot) longer than one SS block time interval (four symbols). The one low bit indicates finer-grained time indication information (a location of an SS block in one slot).

Figure 5:
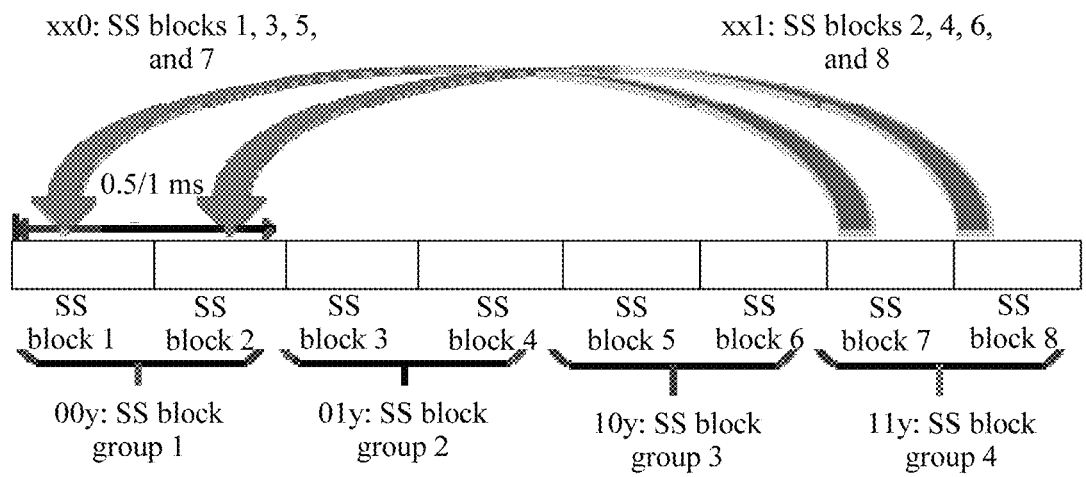
FIG. 5 is a schematic diagram of information carried in a synchronization signal block time index according to an embodiment of this application.

For example, as shown in FIG. 5, four SS block groups are included: an SS block group 1, an SS block group 2, an SS block group 3, and an SS block group 4. Each group includes two SS blocks. The SS block group 1 includes an SS block 1 and an SS block 2. The SS block group 2 includes an SS block 3 and an SS block 4. The SS block group 3 includes an SS block 5 and an SS block 6. The SS block group 4 includes an SS block 7 and an SS block 8. In FIG. 5, three bits are represented by using xxy, where xx indicates two high bits, and y indicates one low bit. It may be learned from FIG. 5 that when xx is 00, the SS block group 1 is indicated; when x is 01, the SS block group 2 is indicated; when xx is 10, the SS block group 3 is indicated; when x is 11, the SS block group 4 is indicated. When y is 0, the SS block 1 or the SS block 3 or the SS block 5 or the SS block 7 is indicated; when y is 1, the SS block 2 or the SS block 4 or the SS block 6 or the SS block 8 is indicated. Specifically, when xxy is equal to 000, the SS block 1 is indicated; when xxy is equal to 001, the SS block 2 is indicated; when xxy is equal to 010, the SS block 3 is indicated; when xxy is equal to 011, the SS block 4 is indicated; when xxy is equal to 100, the SS block 5 is indicated; when xxy is equal to 101, the SS block 6 is indicated; when xxy is equal to 110, the SS block 7 is indicated; when xxy is equal to 111, the SS block 8 is indicated.

A terminal device may obtain SS block time index information of a serving cell from an information bit of a PBCH of the serving cell, or from a PBCH DMRS of the serving cell. In a possible implementation, because it takes the terminal device a relatively long time to read PBCH information of a neighboring cell, to reduce detection complexity of the terminal device, the terminal device may obtain SS block time index information of the neighboring cell from a PBCH DMRS of the neighboring cell.

Case 3: When a carrier frequency band is greater than or equal to 6 GHz, a bit quantity of SS block time index information is 6.

Specifically, three high bits in the six bits required by the SS block time index information may be explicitly carried in an information bit of a PBCH. To be specific, a first part of the SS block time index information is carried. During generation of a PBCH DMRS, SS block time index information of three low bits in the six bits is carried in a DMRS sequence corresponding to the DMRS. To be specific, a second part of the SS block time index information is carried. The three-bit SS block time index information (the first part) carried in the DMRS sequence corresponding to the PBCH DMRS is different from the three-bit SS block time index information (the second part) carried in the information bit of the PBCH.

Three high bits in the six-bit SS block time index information are used to indicate an SS block group number, in other words, an SS block group index, and three low bits are used to indicate an index of an SS block in an SS block group. One SS block group may occupy one subframe (1 ms) or a half subframe (namely, one timeslot (slot), 0.5 ms) or several timeslots in time domain. The three high bits are used to indicate the SS block group index, and indicate coarse-grained time information of a time interval (for example, two consecutive slots) longer than one SS block time interval (four symbols). The three low bits indicate finer-grained time indication information (locations of an SS block in two slots).

In a possible implementation, a terminal device may obtain SS block time index information of a neighboring cell by obtaining three low bits from a synchronization information indication (used as an SS block group number indication) of a serving cell and obtaining three high bits from a PBCH DMRS of the neighboring cell.

In this embodiment of this application, there may be three or two bits in SS block time index information carried in the PBCH DMRS. This does not affect implementation of the foregoing solution, and is not specifically limited herein.

When there are two bits in the SS block time index information carried in the PBCH DMRS, the following manners may be specifically used for implementation:

Case 1: When a carrier frequency band is less than or equal to 3 GHz, four bits may be specifically explicitly carried in an information bit of the PBCH, and the four bits specifically include two-bit SS block time index information and two reserved bits.

During generation of a DMRS sequence of the PBCH, the two-bit SS block time index information is implicitly carried in the DMRS sequence corresponding to the PBCH DMRS, and the two-bit SS block time index information implicitly carried in the DMRS sequence corresponding to the DMRS is the same as the two-bit SS block time index information explicitly carried in the information bit of the PBCH.

Case 2: When a carrier frequency band is greater than or equal to 3 GHz and less than or equal to 6 GHz, a bit quantity of SS block time index information is 3.

Specifically, four bits may be explicitly carried in an information bit of the PBCH, and the three bits specifically include a three-bit SS block time index information and one special bit. Optionally, the three bits may be first three bits in the four bits, and the one special bit is the last one of the four bits. Alternatively, the three bits may be last three bits in the four bits, and the one special bit is the first bit in the four bits. This is not limited in this application.

During generation of a PBCH DMRS, SS block time index information of two bits in the three bits is implicitly carried in a DMRS sequence corresponding to the PBCH DMRS, and remaining one bit in the three bits is explicitly carried in the one special bit in the information bit of the PBCH. The two-bit SS block time index information implicitly carried in the DMRS sequence corresponding to the PBCH DMRS and the one special bit in the information bit of the PBCH together are the same as the SS block time index information of three bits in the four bits that is explicitly carried in the information bit of the PBCH.

Case 3: When a carrier frequency band is greater than or equal to 6 GHz, a bit quantity of SS block time index information is 6.

Specifically, four high bits that is in the six bits and that is required by the SS block time index information may be explicitly carried in an information bit of the PBCH. During generation of a PBCH DMRS, SS block time index information of two low bits in the six bits is implicitly carried in a DMRS sequence corresponding to the PBCH DMRS, and the two-bit SS block time index information implicitly carried in the DMRS sequence corresponding to the DMRS is different from the four-bit SS block time index information explicitly carried in the information bit of the PBCH. To be specific, the two-bit SS block time index information implicitly carried in the DMRS sequence corresponding to the DMRS is a first part of the six-bit SS block time index information, and the four-bit SS block time index information explicitly carried in the information bit of the PBCH is a second part of the six-bit SS block time index information.

Optionally, the first timing information may further include half-frame indication information (half frame index) in addition to the SS block time index. When the first timing information is 3 bits, the SS block time index and the half frame index may jointly indicate eight states. The first to the eighth state values in eight state values are (SS block time index 0, half frame index 0), (SS block time index 1, half frame index 0), (SS block time index 2, half frame index 0), (SS block time index 3, half frame index 0), (SS block time index 0, half frame index 1), (SS block time index 1, half frame index 1), (SS block time index 2, half frame index 1), and (SS block time index 3, half frame index 1). The SS block time index 0 indicates that a synchronization signal block time index is equal to 0, and likewise, the half frame index 0 indicates that half-frame indication information is 0. The SS block time index may represent two bits, and the half frame index represents one bit.

Figure 6:
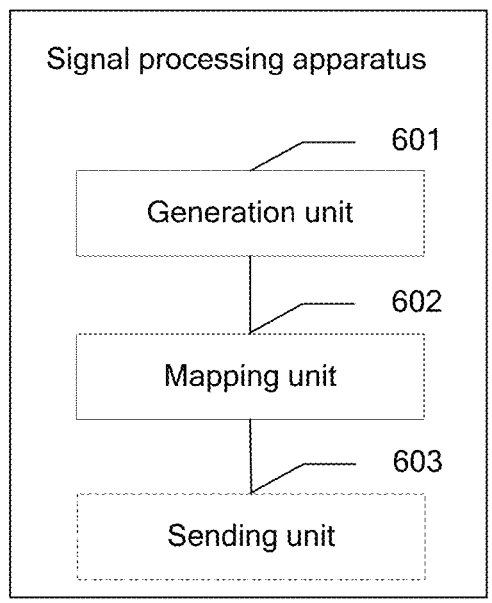
FIG. 6 is a schematic structural diagram of a communications apparatus according to an embodiment of this application.

Based on an inventive idea that is the same as that of the method embodiments, an embodiment of this application further provides a communications apparatus. The communications apparatus may be a processing chip on a base station, or the like. As shown in FIG. 6, the apparatus includes a generation unit 601, configured to generate a reference signal sequence based on a first m-sequence and a second m-sequence. The reference signal sequence is a gold sequence, a cyclic shift value of the first m-sequence is determined based on a physical cell identifier and first timing information, and for a same physical cell identifier, a difference between two cyclic shift values of the first m-sequence that are separately determined based on the physical cell identifier and any two pieces of adjacent first timing information is L1, where L1 is a positive integer, and the first timing information includes a synchronization signal block time index or a first part of the synchronization signal block time index. The apparatus further includes a mapping unit 602, configured to: after modulating the generated reference signal sequence, map a modulated reference signal sequence to N subcarriers to obtain a reference signal, where N is a positive integer greater than or equal to 1.

According to the foregoing solution, a reference signal design method is provided. Specifically, the physical cell identifier and the first timing information are carried in the cyclic shift value of the m-sequence used for generating the reference signal sequence, and for a same physical cell identifier, there is a fixed difference between two cyclic shift values of the first m-sequence that are separately determined based on the physical cell identifier and any two pieces of first timing information, so that cyclic shift values $m_0$ of the first m-sequence are relatively evenly distributed, and therefore detection performance of a PBCH DMRS and detection performance of a PBCH can be improved.

Optionally, a generator polynomial of the first m-sequence is the same as a generator polynomial of one of two m-sequences used for generating a synchronization signal sequence, and a generator polynomial of the second m-sequence is the same as a generator polynomial of the other one of the two m-sequences used for generating the synchronization signal sequence. According to the foregoing design, a generator polynomial of an m-sequence used for generating the reference signal sequence is the same as a generator polynomial of an m-sequence used for generating a synchronization signal sequence, and a simple and effective manner for generating a reference signal sequence is provided.

Optionally, for same first timing information, a difference between two cyclic shift values of the first m-sequence that are separately determined based on the first timing information and any two adjacent physical cell identifiers is L2, and L2 is a positive integer. According to the foregoing design, for same timing information, an interval between cyclic shift values of adjacent cells is fixed, so that cyclic shift values of the first m-sequence are relatively evenly distributed. Therefore, detection performance of the PBCH DMRS and detection performance of the PBCH can be improved.

Optionally, the cyclic shift value $m_0$ of the first m-sequence meets:

$$m_0 = ((N_{cell}^{ID} + a*SS\_block\_idx)*b) \bmod c; \text{ or}$$

$$m_0 = (b*N_{cell}^{ID} + d*SS\_block\_idx) \bmod c,$$

Where $N_{cell}^{ID}$ represents an identifier corresponding to the physical cell identifier, SS_block_idx represents the synchronization signal block time index, a, b, c, and d and each are a non-zero integer, and a, b, c, and d meet at least one of the following constraint conditions:

$$(d*SS\_block\_idx_{max}) \bmod c \leq c - b*N_{cell,max}^{ID};$$

$$d \bmod c \leq \lfloor c/SS\_block\_idx_{max} \rfloor, \text{ where}$$

$d = a*b$, $SS\_block\_idx_{max}$ is a maximum value in SS_block_idx, $N_{cell,max}^{ID}$ is a maximum value in $N_{cell}^{ID}$, mod represents a modulo operation, and $\lfloor \rfloor$ represents a rounding down operation.

Optionally, b is equal to 5, c is equal to 127, and a value of a is any one of the following: 27, 54, 180, 306, 333, and 432.

Optionally, the apparatus may further include a sending unit 603, configured to send the reference signal on the N subcarriers.

Optionally, the reference signal is a demodulation reference signal of a physical channel, and timing information on a first carrier frequency band includes the first timing information. The first timing information is further indicated by using an information bit of the physical channel.

Optionally, the reference signal is a demodulation reference signal, and timing information on a second carrier frequency band includes the first timing information and second timing information. The second timing information is different from the first timing information, and the second timing information is indicated by using an information bit of a physical channel.

According to the foregoing solution, on the first carrier frequency band, both the reference signal sequence (for example, a PBCH DMRS) and an information bit of the PBCH indicate first timing information of a base station on the first carrier frequency band; on the second carrier frequency band, the reference signal sequence (for example, the PBCH DMRS) indicates the first timing information, and the information bit of the PBCH indicates second timing information of the base station on the second carrier frequency band. Therefore, on different carrier frequency bands, a same information bit of the PBCH is used to indicate SS block time index information, thereby ensuring that payloads of PBCHs are as equal as possible, and reducing design complexity of the PBCH and detection complexity of UE.

Optionally, the timing information on the second carrier frequency band includes X information bits. First Y information bits in the X bits are used to indicate the second timing information. Last X-Y information bits in the X bits are used to indicate the first timing information. X is a positive integer greater than or equal to 1, and Y is a positive integer greater than or equal to 1 and less than or equal to X.

Optionally, the second timing information includes a second part of the synchronization signal block time index, or half-frame indication information, or the synchronization signal block time index and half-frame indication information, or a second part of the synchronization signal block time index and half-frame indication information.

Optionally, the first timing information may further include half-frame indication information.

The communications apparatus may be deployed on a base station. Unit division in this embodiment of this application is an example, is only logical function division, and may be other division in actual implementation. In addition, functional units in the embodiments of this application may be integrated into one processor (or processing chip), or may exist alone physically, or two or more units may be integrated into one unit. The integrated unit may be implemented in a form of hardware, or may be implemented in a form of a software functional unit.

Figure 7:
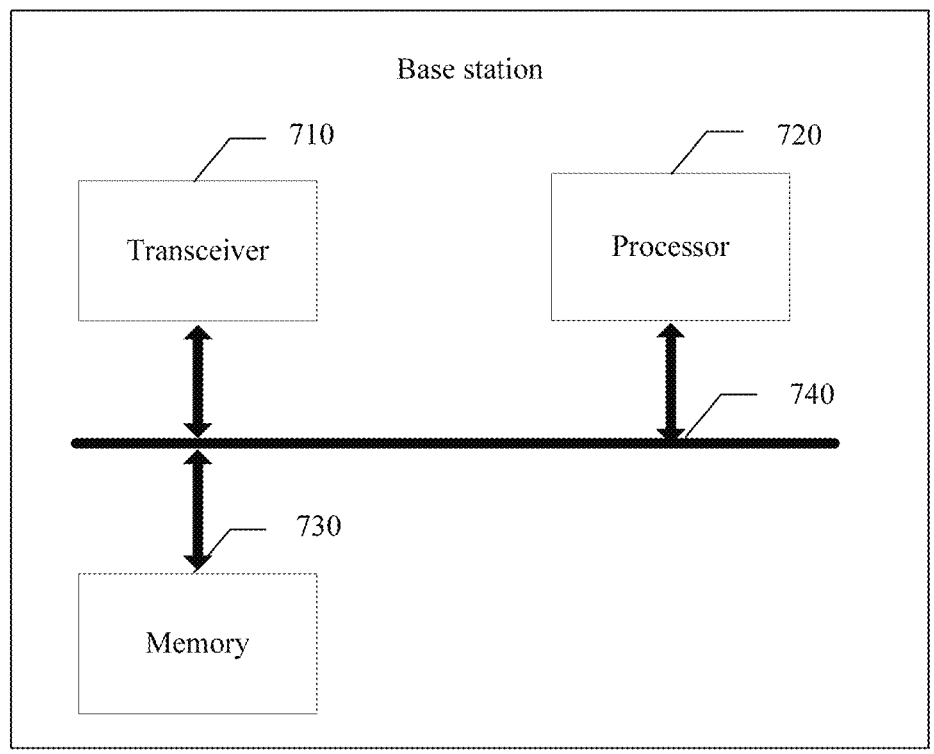
FIG. 7 is a schematic structural diagram of a base station according to an embodiment of this application.

As shown in FIG. 7, a base station may include a transceiver 710, a processor 720, and a memory 730. Both the generation unit 601 and the mapping unit 602 shown in FIG. 7 may be implemented by the processor 720. The processor 720 transmits and receives data by using the transceiver 710, and is configured to implement the method performed by the base station in FIG. 2A, FIG. 2B, FIG. 3A, and FIG. 3B. During implementation, the steps in the processing procedure may be performed by using an integrated logic circuit of hardware in the processor 720 or an instruction in a form of software. The processor 720 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software unit. The program code executed by the processor 720 for implementing the foregoing method may be stored in the memory 730. The memory 730 may be a nonvolatile memory, such as a hard disk drive (HDD for short) or a solid-state drive (SSD for short), or may be a volatile memory (volatile memory), for example, a random access memory (random-access memory, RAM for short). The memory 730 is any other medium that can be used to carry or store expected program code with an instruction or a data structure form and that can be accessed by a computer, but is not limited thereto.

A specific connection medium between the transceiver 710, the processor 720, and the memory 730 is not limited in this embodiment of this application. In this embodiment of this application, in FIG. 7, the memory 730, the processor 720, and the transceiver 710 are connected by using a bus 740, and the bus is represented by a bold line in FIG. 7. A connection manner between other parts is merely an example for description, and does not impose a limitation. The bus may be classified into an address bus, a data bus, a control bus, and the like. For ease of representation, only one bold line is used to represent the bus in FIG. 7, but this does not mean that there is only one bus or only one type of bus.

Figure 8:
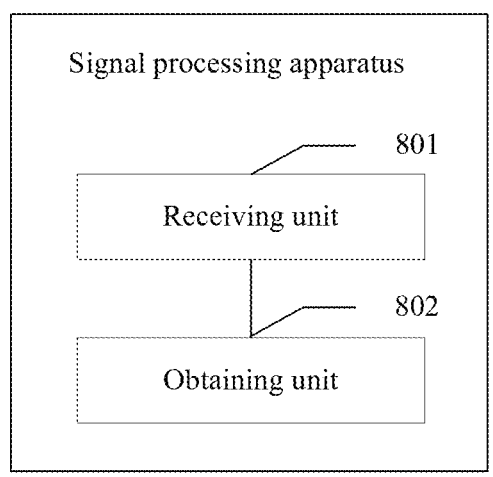
FIG. 8 is a schematic structural diagram of a communications apparatus according to an embodiment of this application.

Based on an inventive idea that is the same as that of the method embodiments, an embodiment of this application further provides a communications apparatus. As shown in FIG. 8, the communications apparatus includes: a receiving unit 801, configured to obtain a reference signal, where a reference signal sequence corresponding to the reference signal is a gold sequence generated based on a first m-sequence and a second m-sequence. A cyclic shift value of the first m-sequence is determined based on a physical cell identifier and first timing information, and for a same physical cell identifier, a difference between two cyclic shift values of the first m-sequence that are separately determined based on the physical cell identifier and any two pieces of adjacent first timing information is L1. L1 is a positive integer, and the first timing information includes a synchronization signal block time index or a first part of the synchronization signal block time index. The communications apparatus further includes an obtaining unit 802, configured to obtain the physical cell identifier and the first timing information based on the reference signal sequence.

In a possible design, a generator polynomial of the first m-sequence is the same as a generator polynomial of one of two m-sequences used for generating a synchronization signal sequence, and a generator polynomial of the second m-sequence is the same as a generator polynomial of the other one of the two m-sequences used for generating the synchronization signal sequence.

In a possible design, for same first timing information, a difference between two cyclic shift values of the first m-sequence that are separately determined based on the first timing information and any two adjacent physical cell identifiers is L2, and L2 is a positive integer.

In a possible design, the cyclic shift value $m_0$ of the first m-sequence meets:

$m_0 = ((N_{cell}^{ID} + a*SS\_block\_idx)*b) \bmod c$; or $m_0 = (b*N_{cell}^{ID} + d*SS\_block\_idx) \bmod c$, where $N_{cell}^{ID}$ represents an identifier corresponding to the physical cell identifier, SS_block_idx represents the synchronization signal block time index, a, b, c, and d each are a non-zero integer, and a, b, c, and d meet at least one of the following constraint conditions:

$(d*SS\_block\_idx_{max}) \bmod c \leq c - b*N_{cell,max}^{ID}$; and $d \bmod c \leq \lfloor c/SS\_block\_idx_{max} \rfloor$, where $d = a*b$, $SS\_block\_idx_{max}$ is a maximum value in SS_block_idx, $N_{cell,max}^{ID}$ is a maximum value in represents a modulo operation, and $\lfloor \ \rfloor$ represents a rounding down operation.

In a possible design, b is equal to 5, c is equal to 127, and a value of a is any one of the following: 27, 54, 180, 306, 333, and 432.

In a possible design, the receiving unit 801 is specifically configured to receive the reference signal on N subcarriers, where N is a positive integer greater than or equal to 1.

In a possible design, the reference signal is a demodulation reference signal of a physical channel, and timing information on a first carrier frequency band includes the first timing information. The first timing information is further indicated by using an information bit of the physical channel.

In a possible design, the reference signal is a demodulation reference signal of a physical channel, and timing information on a second carrier frequency band includes the first timing information and second timing information. The second timing information is different from the first timing information, and the second timing information is indicated by using an information bit of the physical channel.

In a possible design, the timing information on the second carrier frequency band includes X information bits. First Y information bits in the X bits are used to indicate the second timing information. Last X-Y information bits in the X bits are used to indicate the first timing information. X is a positive integer greater than or equal to 1, and Y is a positive integer greater than or equal to 1 and less than or equal to X.

In a possible design, the second timing information includes a second part of the synchronization signal block time index, or half-frame indication information, or the synchronization signal block time index and half-frame indication information, or a second part of the synchronization signal block time index and half-frame indication information.

In a possible design, the first timing information further includes half-frame indication information.

Unit division in this embodiment of this application is an example, is only logical function division, and may be other division in actual implementation. In addition, functional units in the embodiments of this application may be integrated into one processor, or may exist alone physically, or two or more units are integrated into one unit. The integrated unit may be implemented in a form of hardware, or may be implemented in a form of a software functional unit.

Figure 9:
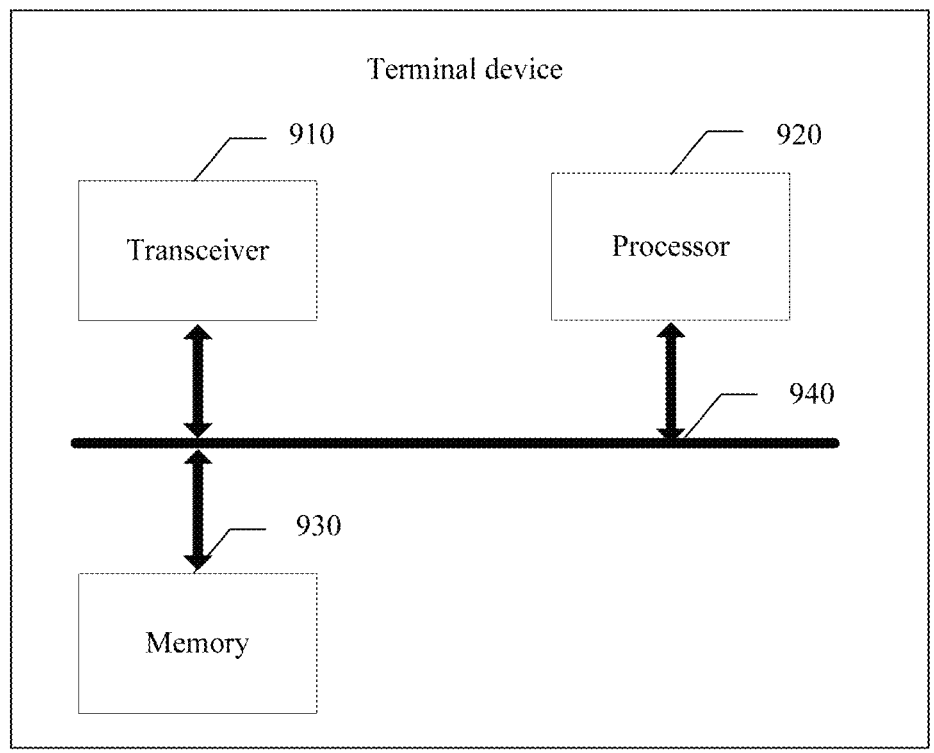
FIG. 9 is a schematic structural diagram of a terminal device according to an embodiment of this application.

As shown in FIG. 9, a base station may include a transceiver 910, a processor 920, and a memory 930. Both the receiving unit 801 and the obtaining unit 802 shown in FIG. 8 may be implemented by the processor 920. The processor 920 transmits and receives data by using the transceiver 910, and is configured to implement the method performed by the base station in FIG. 2A, FIG. 2B, FIG. 3A, and FIG. 3B. During implementation, the steps in the processing procedure may be completed by using an integrated logic circuit of hardware in the processor 920 or an instruction in a form of software. The processor 920 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software unit. The program code executed by the processor 920 for implementing the foregoing method may be stored in the memory 930. The memory 930 may be a nonvolatile memory such as a hard disk or a solid state disk, or may be a volatile memory such as a random access memory. The memory 930 is any other medium that can be used to carry or store expected program code with an instruction or a data structure form and that can be accessed by a computer, but is not limited thereto.

A specific connection medium between the transceiver 910, the processor 920, and the memory 930 is not limited in this embodiment of this application. In this embodiment of this application, in FIG. 9, the memory 930, the processor 920, and the transceiver 910 are connected by using a bus 940, and the bus is represented by a bold line in FIG. 9. A connection manner between other parts is merely an example for description, and does not impose a limitation. The bus may be classified into an address bus, a data bus, a control bus, and the like. For ease of representation, only one bold line is used to represent the bus in FIG. 9, but this does not mean that there is only one bus or only one type of bus.

Based on the foregoing embodiments, an embodiment of this application further provides a computer storage medium. The storage medium stores a software program, and the software program may implement the method provided in the foregoing embodiments when being read and executed by one or more processors. The computer storage medium includes any medium that can store program code, such as a USB flash drive, a removable hard disk, a read-only memory, a random access memory, a magnetic disk, or a compact disc.

Based on the foregoing embodiments, an embodiment of this application further provides a chip system, where the chip system includes a processor, configured to support a distributed unit, a centralized unit, and a base station in implementing functions in the foregoing embodiments, for example, generating or processing data and/or information involved in the foregoing methods. Optionally, the chip system further includes a memory, and the memory is configured to store a program instruction and data necessary for a distributed unit, a centralized unit, and a base station. The chip system may include a chip, or include a chip and another discrete device. It should be understood that data and/or information processed by the chip may be received from a terminal device, or may be sent to a terminal device.

Based on the foregoing embodiments, an embodiment of this application further provides a chip system, where the chip system includes a processor, configured to support a distributed unit, a centralized unit, and a terminal device in implementing functions in the foregoing embodiments, for example, generating or processing data and/or information involved in the foregoing methods. Optionally, the chip system further includes a memory, and the memory is configured to store a program instruction and data necessary for a distributed unit, a centralized unit, and a terminal device. The chip system may include a chip, or include a chip and another discrete device. It should be understood that the data and/or information processed by the chip may be received from a base station, or may be sent to a base station.

This application further provides the following embodiments.

Embodiment 1: A signal processing method, including generating a reference signal sequence based on a first m-sequence and a second m-sequence. The reference signal sequence is a gold sequence, a cyclic shift value of the first m-sequence is determined based on a physical cell identifier and first timing information, and for a same physical cell identifier, a difference between two cyclic shift values of the first m-sequence that are separately determined based on the physical cell identifier and any two pieces of adjacent first timing information is L1, where L1 is a positive integer. The first timing information includes a synchronization signal block time index or a first part of the synchronization signal block time index. The method further includes after modulating the generated reference signal sequence, mapping a modulated reference signal sequence to N subcarriers to obtain a reference signal, where N is a positive integer greater than or equal to 1.

According to the foregoing solution, a reference signal design method is provided. Specifically, the physical cell identifier and the first timing information are carried in the cyclic shift value of the m-sequence used for generating the reference signal sequence, and for a same physical cell identifier, there is a fixed difference between two cyclic shift values of the first m-sequence that are separately determined based on the physical cell identifier and any two pieces of first timing information, so that cyclic shift values $m_0$ of the first m-sequence are relatively evenly distributed, and therefore detection performance of a PBCH DMRS and detection performance of a PBCH can be improved.

Embodiment 2: According to the method in Embodiment 1, a generator polynomial of the first m-sequence is the same as a generator polynomial of one of two m-sequences used for generating a synchronization signal sequence, and a generator polynomial of the second m-sequence is the same as a generator polynomial of the other one of the two m-sequences used for generating the synchronization signal sequence. According to Embodiment 2, a generator polynomial of an m-sequence used for generating the reference signal sequence is the same as a generator polynomial of an m-sequence used for generating a synchronization signal sequence, and a simple and effective manner for generating a reference signal sequence is provided.

Embodiment 3: According to the method in Embodiment 1 or 2, for same first timing information, a difference between two cyclic shift values of the first m-sequence that are separately determined based on the first timing information and any two adjacent physical cell identifiers is L2, and L2 is a positive integer.

According to Embodiment 3, for same timing information, an interval between cyclic shift values of adjacent cells is fixed, so that cyclic shift values of the first m-sequence are relatively evenly distributed. Therefore, detection performance of the PBCH DMRS and detection performance of the PBCH can be improved.

Embodiment 4: According to the method in any one of Embodiment 1 to Embodiment 3, the cyclic shift value $m_0$ of the first m-sequence meets:

$$m_0=((N_{cell}^{ID}+a*SS\_block\_idx)*b) \bmod c; \text{ or}$$

$$m_0=(b*N_{cell}^{ID}+d*SS\_block\_idx) \bmod c, \text{ where}$$

$N_{cell}^{ID}$ represents an identifier corresponding to the physical cell identifier, SS_clock_idx represents the synchronization signal block time index, a, b, c, and d each are a non-zero integer, and a, b, c, and d meet at least one of the following constraint conditions:

$$(d*SS\_block\_idx_{max}) \bmod c \le c - b*N_{cell,max}^{ID};$$

$$d \bmod c \le \lfloor c/SS\_block\_idx_{max} \rfloor, \text{ where}$$

d=a*b, $SS\_block\_idx_{max}$ is a maximum value in SS_block_idx, $N_{cell,max}^{ID}$ is a maximum value in $N_{cell}^{ID}$, mod represents a modulo operation, and $\lfloor\ \rfloor$ represents a rounding down operation.

Embodiment 5: According to the method in Embodiment 4, b is equal to 5, c is equal to 127, and a value of a is any one of the following: 27, 54, 180, 306, 333, and 432.

Embodiment 6: According to the method in any one of Embodiment 1 to Embodiment 5, the method further includes sending the reference signal on the N subcarriers.

Embodiment 7: According to the method in Embodiment 6, the reference signal is a demodulation reference signal of a physical channel, timing information on a first carrier frequency band includes the first timing information, and the first timing information is further indicated by using an information bit of the physical channel.

According to the foregoing solution, on the first carrier frequency band, both the reference signal sequence (for example, a PBCH DMRS) and an information bit of a PBCH indicate first timing information of a base station on the first carrier frequency band; on a second carrier frequency band, the reference signal sequence (for example, the PBCH DMRS) indicates the first timing information and the information bit of the PBCH indicates second timing information of the base station on the second carrier frequency band. Therefore, on different carrier frequency bands, a same information bit of the PBCH is used to indicate SS block time index information, thereby ensuring that payloads of PBCHs are as equal as possible, and reducing design complexity of the PBCH and detection complexity of UE.

Embodiment 8: According to the method in Embodiment 6 or 7, the reference signal is a demodulation reference signal of a physical channel, timing information on a second carrier frequency band includes the first timing information and second timing information, the second timing information is different from the first timing information, and the second timing information is indicated by using an information bit of the physical channel.

Embodiment 9: According to the method in Embodiment 8, the timing information on the second carrier frequency band includes X information bits, where first Y information bits in the X bits are used to indicate the second timing information, last X-Y information bits in the X bits are used to indicate the first timing information, X is a positive integer greater than or equal to 1, and Y is a positive integer greater than or equal to 1 and less than or equal to X.

Embodiment 10: According to the method in Embodiment 8 or 9, the second timing information includes a second part of the synchronization signal block time index, or half-frame indication information, or the synchronization signal block time index and half-frame indication information, or a second part of the synchronization signal block time index and half-frame indication information.

Embodiment 11: According to the method in any one of Embodiment 1 to Embodiment 10, the first timing information further includes the half-frame indication information.

Embodiment 12: A signal processing method, including obtaining a reference signal. A reference signal sequence corresponding to the reference signal is a gold sequence generated based on a first m-sequence and a second m-sequence. A cyclic shift value of the first m-sequence is determined based on a physical cell identifier and first timing information, and for a same physical cell identifier. A difference between two cyclic shift values of the first m-sequence that are separately determined based on the physical cell identifier and any two pieces of adjacent first timing information is L1. L1 is a positive integer, and the first timing information includes a synchronization signal block time index or a first part of the synchronization signal block time index. The signal processing method further includes obtaining the physical cell identifier and the first timing information based on the reference signal.

Embodiment 13: According to the method in Embodiment 12, a generator polynomial of the first m-sequence is the same as a generator polynomial of one of two m-sequences used for generating a synchronization signal sequence, and a generator polynomial of the second m-sequence is the same as a generator polynomial of the other one of the two m-sequences used for generating the synchronization signal sequence.

Embodiment 14: According to the method in Embodiment 12 or 13, for same first timing information, a difference between two cyclic shift values of the first m-sequence that are separately determined based on the first timing information and any two adjacent physical cell identifiers is L2, and L2 is a positive integer.

Embodiment 15: According to the method in any one of Embodiment 12 to Embodiment 14, the cyclic shift value $m^0$ of the first m-sequence meets:

$$m_0=((N_{cell}^{ID}+a*SS\_block\_idx)*b) \bmod c; \text{ or}$$

$$m_0=(b*N_{cell}^{ID}+d*SS\_block\_idx) \bmod c, \text{ where}$$

$N_{cell}^{ID}$ represents an identifier corresponding to the physical cell identifier, SS_block_idx represents the synchronization signal block time index, a, b, c, and d each are a non-zero integer, and a, b, c, and d meet at least one of the following constraint conditions:

$$(d*SS\_block\_idx_{max}) \bmod c \le c - b*N_{cell,max}^{ID};$$

$$d \bmod c \le \lfloor c/SS\_block\_idx_{max} \rfloor, \text{ where}$$

d=a*b, SS_block_idx$_{max}$ is a maximum value in SS_block_idx, $N_{cell,max}^{ID}$ is a maximum value in $N_{cell}^{ID}$, mod represents a modulo operation, and $\lfloor \ \rfloor$ represents a rounding down operation.

Embodiment 16: According to the method in Embodiment 15, b is equal to 5, c is equal to 127, and a value of a is any one of the following: 27, 54, 180, 306, 333, and 432.

Embodiment 17. According to the method in any one of Embodiment 12 to Embodiment 16, the obtaining a reference signal includes:

receiving the reference signal on N subcarriers, where N is a positive integer greater than or equal to 1.

Embodiment 18: According to the method in Embodiment 17, the reference signal is a demodulation reference signal of a physical channel, timing information on a first carrier frequency band includes the first timing information, and the first timing information is further indicated by using an information bit of the physical channel.

Embodiment 19: According to the method in Embodiment 17 or 18, the reference signal is a demodulation reference signal of a physical channel, timing information on a second carrier frequency band includes the first timing information and second timing information, the second timing information is different from the first timing information, and the second timing information is indicated by using an information bit of the physical channel.

Embodiment 20: According to the method in Embodiment 19, the timing information on the second carrier frequency band includes X information bits, where first Y information bits in the X bits are used to indicate the second timing information, last X-Y information bits in the X bits are used to indicate the first timing information, X is a positive integer greater than or equal to 1, and Y is a positive integer greater than or equal to 1 and less than or equal to X.

Embodiment 21: According to the method in Embodiment 19 or 20, the second timing information includes a second part of the synchronization signal block time index, or half-frame indication information, or the synchronization signal block time index and half-frame indication information, or a second part of the synchronization signal block time index and half-frame indication information.

Embodiment 22: According to the method in any one of Embodiment 12 to Embodiment 21, the first timing information further includes the half-frame indication information.

Embodiment 23: A base station, including a transceiver, a memory, and a processor, where the memory stores a software program. The transceiver is configured to transmit and receive data; and the processor is configured to: invoke and execute the software program stored in the memory, and transmit and receive data by using the transceiver, to implement the method in any one of Embodiment 1 to Embodiment 11.

Embodiment 24: A terminal device, including a transceiver, a memory, and a processor, where the memory stores a software program. The transceiver is configured to transmit and receive data; and the processor is configured to: invoke and execute the software program stored in the memory, and transmit and receive data by using the transceiver, to implement the method in any one of Embodiment 12 to Embodiment 22.

Embodiment 25: A chip, where the chip is connected to a memory, and is configured to read and execute a software program stored in the memory, to implement the method in any one of Embodiment 1 to Embodiment 22.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
   generating, by a communications device, a reference signal sequence of a physical channel in accordance with a first m-sequence and a second m-sequence, wherein the reference signal sequence is a gold sequence, the reference signal sequence is related to a physical cell identifier and first timing information, and the first timing information comprises at least a first part of a synchronization signal block time index; modulating the generated reference signal sequence; and in response to modulating the generated reference signal sequence, mapping a modulated reference signal sequence to N subcarriers to obtain a reference signal, wherein N is a positive integer greater than or equal to 1; and wherein a cyclic shift value $m_0$ of the first m-sequence meets:

$m_0 = ((N_{cell}^{ID} + a*SS\_block\_idx)*b) \bmod c$; or $m_0 = (b*N_{cell}^{ID} + d*SS\_block\_idx) \bmod c$, where wherein $N_{cell}^{ID}$ represents an identifier corresponding to the physical cell identifier, SS_block_idx represents the synchronization signal block time index, a, b, c, and d each are a non-zero integer, and a, b, c, and d meet at least one of the following constraint conditions:

$(d*SS\_block\_idx_{max}) \bmod c \leq c - b*N_{cell,max}^{ID}$;

$d \bmod c \leq \lfloor c/SS\_block\_idx_{max} \rfloor$, where wherein $d = a*b$, $SS\_block\_idx_{max}$ is a maximum value in SS_block_idx, $N_{cell,max}^{ID}$ is a maximum value in $N_{cell}^{ID}$, mod represents a modulo operation, and $\lfloor \, \rfloor$ represents a rounding down operation.

2. The method according to claim 1, further comprising: sending the reference signal on the N subcarriers.

3. The method according to claim 1, further comprising: obtaining the physical cell identifier and the first timing information via an initialized value of the reference signal sequence or a cyclic shift value of the reference signal sequence.

4. The method according to claim 1, further comprising: obtaining the first timing information via an information bit of the physical channel.

5. The method according to claim 1, wherein the first timing information further comprises half-frame indication information.

6. The method according to claim 1, wherein the reference signal sequence of the physical channel comprises a demodulation reference signal (DMRS) sequence of the physical channel.

7. The method according to claim 1, wherein the physical channel comprises a physical broadcast channel.

8. The method according to claim 1, wherein a carrier frequency band of the N subcarriers is less than or equal to 3 GHz.

9. A signal processing method, comprising:
obtaining, by a communications device, a reference signal of a physical channel, wherein a reference signal sequence corresponding to the reference signal is a gold sequence generated in accordance with a first m-sequence and a second m-sequence;
obtaining a physical cell identifier and first timing information in accordance with the reference signal sequence, wherein the first timing information comprises at least a first part of a synchronization signal block time index; and
wherein a cyclic shift value $m_0$ of the first m-sequence meets:

$m_0 = ((N_{cell}^{ID} + a*SS\_block\_idx)*b) \bmod c$; or $m_0 = (b*N_{cell}^{ID} + d*SS\_block\_idx) \bmod c$, where wherein $N_{cell}^{ID}$ represents an identifier corresponding to the physical cell identifier, SS_block_idx represents the synchronization signal block time index, a, b, c, and d each are a non-zero integer, and a, b, c, and d meet at least one of the following constraint conditions:

$(d*SS\_block\_idx_{max}) \bmod c \leq c - b*N_{cell,max}^{ID}$;

$d \bmod c \leq \lfloor c/SS\_block\_idx_{max} \rfloor$, where wherein $d = a*b$, $SS\_block\_idx_{max}$ is a maximum value in SS_block_idx, $N_{cell,max}^{ID}$ is a maximum value in $N_{cell}^{ID}$, mod represents a modulo operation, and $\lfloor \, \rfloor$ represents a rounding down operation.

10. The method according to claim 9, further comprising: receiving the reference signal on N subcarriers, wherein N is a positive integer greater than or equal to 1.

11. The method according to claim 10, wherein a carrier frequency band of the N subcarriers is less than or equal to 3 GHz.

12. The method according to claim 9, wherein obtaining the physical cell identifier and the first timing information in accordance with the reference signal sequence comprises obtaining the physical cell identifier and the first timing information in accordance with an initialized value of the reference signal sequence or a cyclic shift value of the reference signal sequence.

13. The method according to claim 9, wherein the first timing information further comprises half-frame indication information.

14. The method according to claim 9, wherein the reference signal sequence comprises a demodulation reference signal (DMRS) sequence of the physical channel.

15. The method according to claim 9, wherein obtaining the physical cell identifier and the first timing information in accordance with the reference signal sequence comprises obtaining the first timing information via an information bit of the physical channel.

16. The method according to claim 9, wherein the physical channel comprises a physical broadcast channel.

17. A communications apparatus, comprising:
a processor; and
a non-transitory computer-readable storage medium storing a program to be executed by the processor, the program including instructions for:
generating a reference signal sequence of a physical channel in accordance with a first m-sequence and a second m-sequence, wherein the reference signal sequence is a gold sequence, the reference signal sequence is related to a physical cell identifier and first timing information, and the first timing information comprises at least a first part of a synchronization signal block time index;
modulating the generated reference signal sequence; and
in response to modulating the generated reference signal sequence, mapping a modulated reference signal sequence to N subcarriers to obtain a reference signal, wherein N is a positive integer greater than or equal to 1; and
wherein a cyclic shift value $m_0$ of the first m-sequence meets:

$m_0 = ((N_{cell}^{ID} + a*SS\_block\_idx)*b) \bmod c$; or $m_0 = (b*N_{cell}^{ID} + d*SS\_block\_idx) \bmod c$, where wherein $N_{cell}^{ID}$ represents an identifier corresponding to the physical cell identifier, SS_block_idx represents the synchronization signal block time index, a, b, c, and d each are a non-zero integer, and a, b, c, and d meet at least one of the following constraint conditions:

$$(d*SS\_block\_idx_{max}) \bmod c \leq c - b*N_{cell,max}^{ID};$$

$$d \bmod c \leq \lfloor c/SS\_block\_idx_{max} \rfloor, \text{ where}$$

wherein $d=a*b$, $SS\_block\_idx_{max}$ is a maximum value in $SS\_block\_idx$, $N_{cell,max}^{ID}$ is a maximum value in $N_{cell}^{ID}$, mod represents a modulo operation, and $\lfloor \; \rfloor$ represents a rounding down operation.

18. The communications apparatus according to claim 17, further comprising:
 a transmitter, configured to send the reference signal on the N subcarriers.

19. The communications apparatus according to claim 17, wherein the instructions comprise further instructions for obtaining the physical cell identifier and the first timing information via an initialized value of the reference signal sequence or a cyclic shift value of the reference signal sequence.

20. The communications apparatus according to claim 17, wherein the instructions comprise further instructions for obtaining the first timing information via an information bit of the physical channel.

21. The communications apparatus according to claim 17, wherein the first timing information further comprises half-frame indication information.

22. The communications apparatus according to claim 17, wherein the reference signal sequence comprises a demodulation reference signal (DMRS) sequence of the physical channel.

23. The communications apparatus according to claim 17, wherein the physical channel comprises a physical broadcast channel.

24. The communications apparatus according to claim 17, wherein a frequency band of the N subcarriers is less than or equal to 3 GHz.

25. A communications apparatus, comprising:
 a processor;
 a receiver, configured to obtain a reference signal of a physical channel, wherein a reference signal sequence corresponding to the reference signal is a gold sequence generated in accordance with a first m-sequence and a second m-sequence; and
 a non-transitory computer-readable storage medium storing a program to be executed by the processor, the program including instructions for obtaining a physical cell identifier and first timing information in accordance with the reference signal sequence, wherein the first timing information comprises at least a first part of a synchronization signal block time index; and
 wherein a cyclic shift value $m_0$ of the first m-sequence meets:

$$m_0 = ((N_{cell}^{ID} + a*SS\_block\_idx)*b) \bmod c; \text{ or}$$

$$m_0 = (b*N_{cell}^{ID} + d*SS\_block\_idx) \bmod c, \text{ where}$$

wherein $N_{cell}^{ID}$ represents an identifier corresponding to the physical cell identifier, $SS\_block\_idx$ represents the synchronization signal block time index, a, b, c, and d each are a non-zero integer, and a, b, c, and d meet at least one of the following constraint conditions:

$$(d*SS\_block\_idx_{max}) \bmod c \leq c - b*N_{cell,max}^{ID};$$

$$d \bmod c \leq \lfloor c/SS\_block\_idx_{max} \rfloor, \text{ where}$$

wherein $d=a*b$, $SS\_block\_idx_{max}$ is a maximum value in $SS\_block\_idx$, $N_{cell,max}^{ID}$ is a maximum value in $N_{cell}^{ID}$, mod represents a modulo operation, and $\lfloor \; \rfloor$ represents a rounding down operation.

26. The communications apparatus according to claim 25, wherein the receiver is further configured to:
 receive the reference signal on N subcarriers, wherein N is a positive integer greater than or equal to 1.

27. The communications apparatus according to claim 26, wherein a carrier frequency band of the N subcarriers is less than or equal to 3 GHz.

28. The communications apparatus according to claim 25, wherein the instructions comprise further instructions for obtaining the physical cell identifier and the first timing information via an initialized value of the reference signal sequence or a cyclic shift value of the reference signal sequence.

29. The communications apparatus according to claim 25, wherein the instructions comprise further instructions for obtaining the first timing information via an information bit of the physical channel.

30. The communications apparatus according to claim 25, wherein the first timing information further comprises half-frame indication information.

31. The communications apparatus according to claim 25, wherein the reference signal sequence comprises a demodulation reference signal (DMRS) sequence of the physical channel.

32. The communications apparatus according to claim 25, wherein the physical channel comprises a physical broadcast channel.

* * * * *